(12) United States Patent
Bhattacharya et al.

(10) Patent No.: US 10,817,930 B1
(45) Date of Patent: *Oct. 27, 2020

(54) SYSTEMS AND METHODS OF ELECTRONIC CLOSET RECOMMENDATION ENGINES AND DISPLAYS OF AN APPAREL SUBSCRIPTION APPLICATION

(71) Applicant: CaaStle, Inc., New York, NY (US)

(72) Inventors: Arnab Bhattacharya, Uttar Pradesh (IN); Georgiy Goldenberg, Los Altos, CA (US); Aurelien Labonne, Metuchen, NJ (US)

(73) Assignee: CaaStle, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,195

(22) Filed: Nov. 27, 2019

Related U.S. Application Data

(63) Continuation of application No. 16/406,765, filed on May 8, 2019, now Pat. No. 10,540,708.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0641* (2013.01); *G06Q 30/0222* (2013.01); *G06Q 30/0226* (2013.01); *G06Q 30/0603* (2013.01); *G06Q 30/0631* (2013.01); *G06Q 30/0633* (2013.01); *G06Q 30/0645* (2013.01)

(58) Field of Classification Search
CPC ..... G06Q 30/0241–0277; G06Q 30/06; G06Q 30/0601–0643; G06Q 30/08
See application file for complete search history.

(56) References Cited

U.S. PATENT DOCUMENTS

| | | |
|---|---|---|
| 2008/0126190 A1 | 5/2008 | Gosnell |
| 2010/0030663 A1 | 2/2010 | Wannier |
| 2011/0173094 A1 | 7/2011 | Krueger |
| 2015/0039549 A1 | 2/2015 | Aufmann |
| 2015/0058083 A1 | 2/2015 | Herrero |
| 2015/0095184 A1 | 4/2015 | Ainsworth |
| 2017/0287044 A1 | 10/2017 | Rose |

OTHER PUBLICATIONS www.caastle.com. Dated from Mar. 24, 2018-Mar. 25, 2018. Recovered from www.Archive.org. (Year: 2018).
"Amazon has rolled out its 'try before you buy' shopping service to all Prime members. Here's what it's like to use." Madeline Stone. Jul. 6, 2018. Business Wire. (Year: 2018).

*Primary Examiner* — William J Allen
(74) *Attorney, Agent, or Firm* — Bookoff McAndrews, PLLC

(57) ABSTRACT

A computer-implemented method for providing electronic recommendation engines and displays of an apparel subscription application may comprise determining a status of the user as being a valid user of electronic closet recommendation engines and displays of an apparel subscription application; determining, if the user is a valid user, a presence of apparel data in an assistant section of an electronic record corresponding to the user in a database of the electronic closet recommendation engines and displays; and launching the assistant section of a user interface of the apparel subscription application, if the apparel data is present in the assistant section of the electronic record.

20 Claims, 16 Drawing Sheets

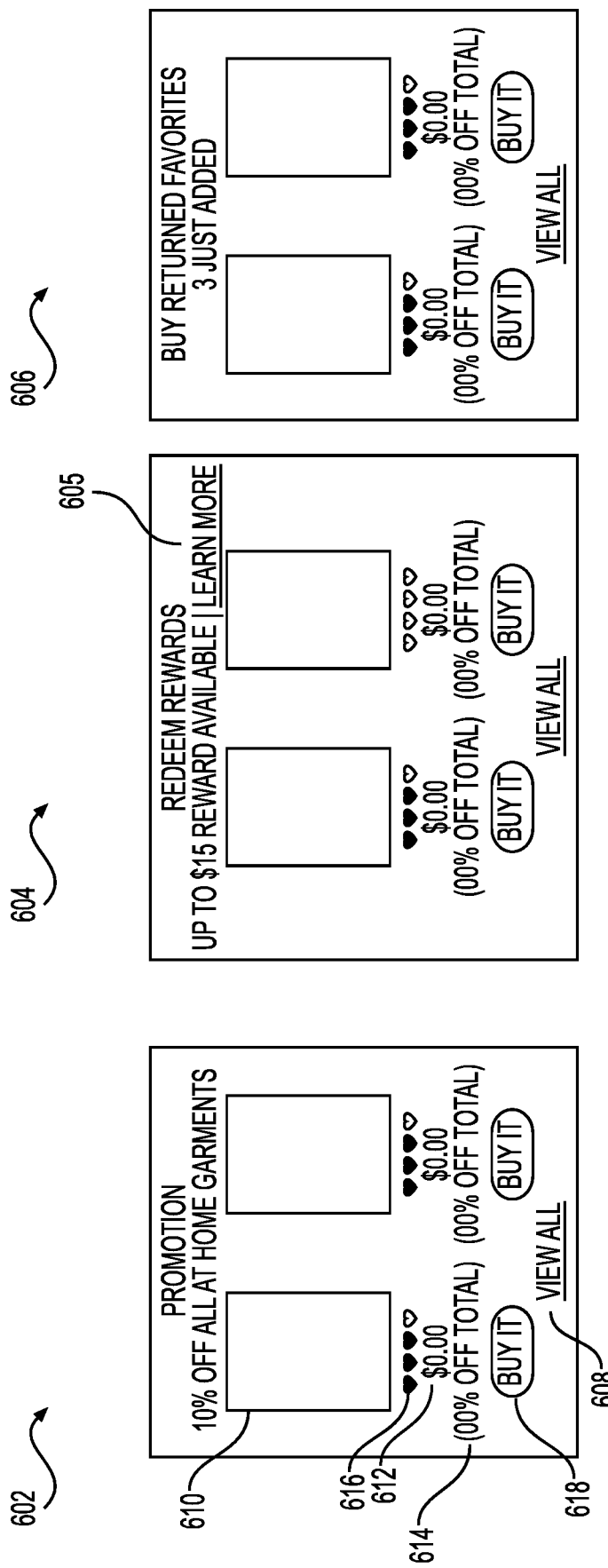

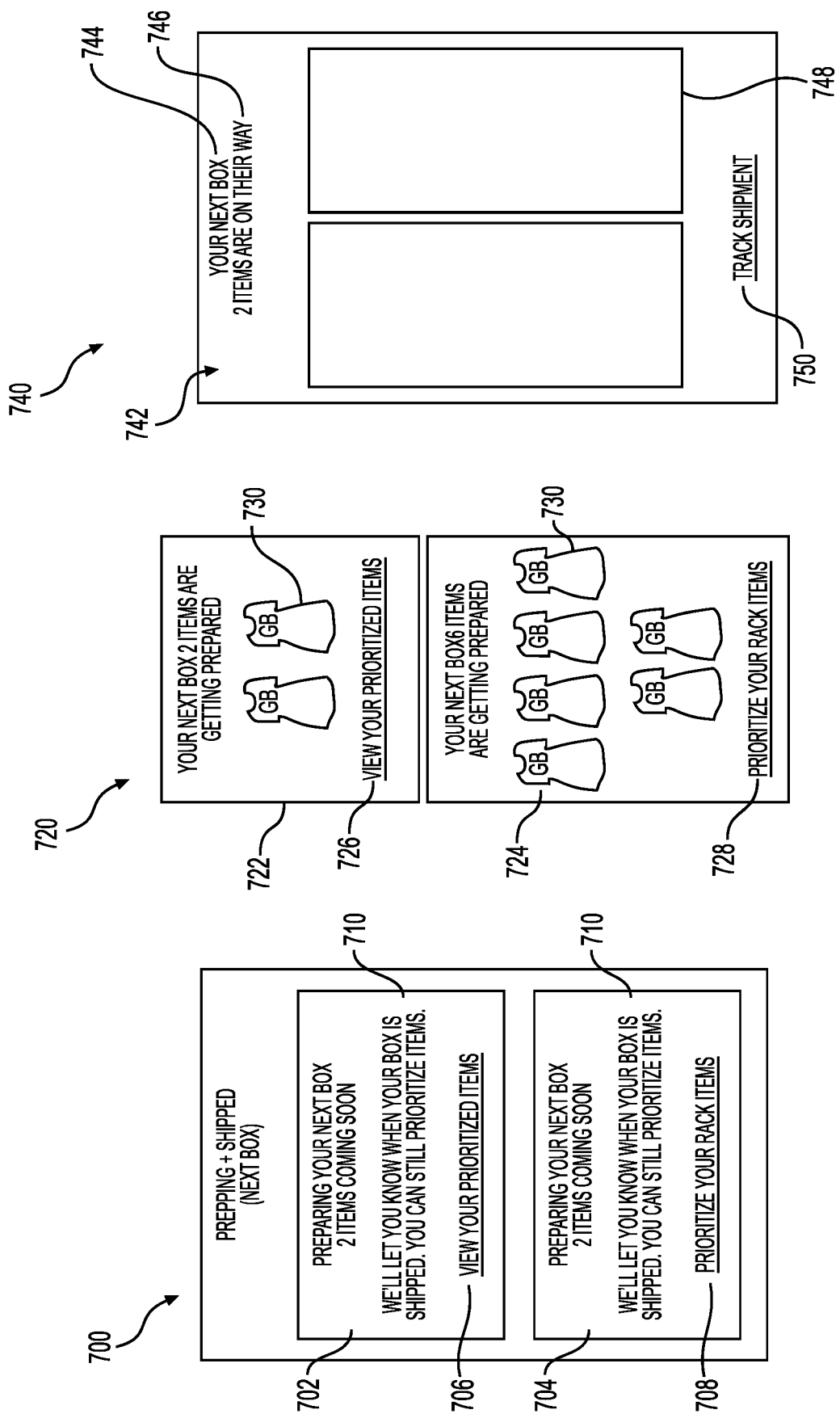

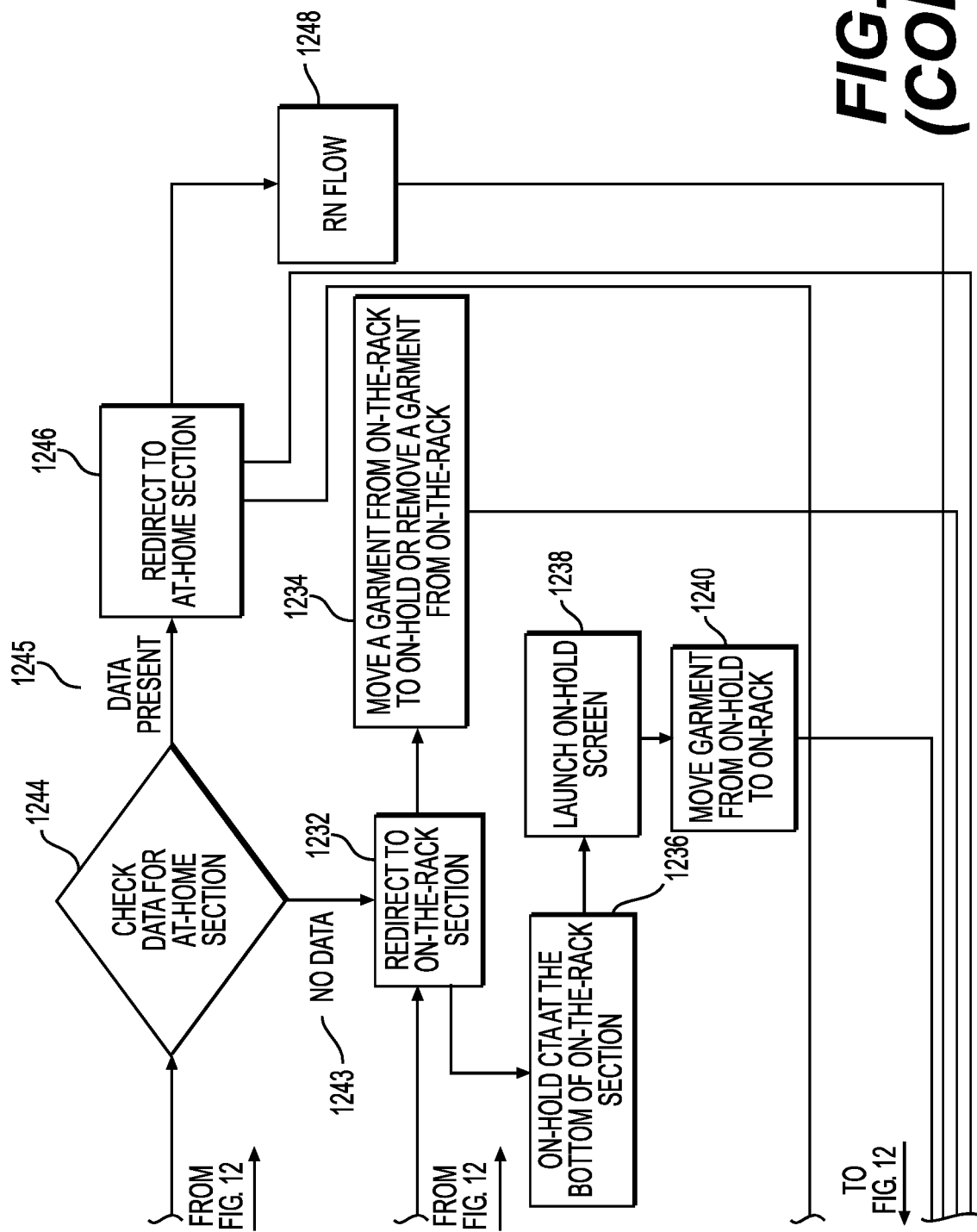

1500

1502 — DETERMINING A STATUS OF THE USER AS BEING A VALID USER OF AN ELECTRONIC CLOSET ASSISTANCE SERVICE OF AN APPAREL SUBSCRIPTION APPLICATION

1504 — DETERMINING, IF THE USER IS A VALID USER, A PRESENCE OF APPAREL DATA IN AN ASSISTANT SECTION OF AN ELECTRONIC RECORD CORRESPONDING TO THE USER IN A DATABASE OF THE ELECTRONIC CLOSET ASSISTANCE SERVICE

1506 — LAUNCHING THE ASSISTANT SECTION OF A USER INTERFACE OF THE APPAREL SUBSCRIPTION APPLICATION, IF THE APPAREL DATA IS PRESENT IN THE ASSISTANT SECTION OF THE ELECTRONIC RECORD

1508 — ENABLING THE USER TO MANIPULATE ONE OR MORE GRAPHICAL ELEMENTS OF THE ASSISTANT SECTION TO MAKE ONE OR MORE SELECTIONS OF THE APPAREL DATA TO RECEIVE APPAREL VIA THE APPAREL SUBSCRIPTION APPLICATION

1510 — UPDATING THE APPAREL DATA BASED ON THE ONE OR MORE SELECTIONS MADE BY THE USER

1512 — ANALYZING THE UPDATED APPAREL DATA TO DISPLAY ONE OR MORE SUGGESTIONS TO THE USER IN THE ASSISTANT SECTION OF THE USER INTERFACE

FIG. 15

SYSTEMS AND METHODS OF ELECTRONIC CLOSET RECOMMENDATION ENGINES AND DISPLAYS OF AN APPAREL SUBSCRIPTION APPLICATION

CROSS-REFERENCE TO RELATED APPLICATION

This application is a continuation of and claims the benefit of priority to pending U.S. application Ser. No. 16/406,765, filed May 8, 2019, which is incorporated herein by reference in its entirety.

TECHNICAL FIELD

Various embodiments of the present disclosure generally relate to electronic product recommendations in the context of mobile applications and e-commerce websites and, more particularly, to providing electronic closet recommendation engines and displays of an apparel subscription application.

BACKGROUND

For subscription-based services, a key driver for retaining subscribers and enhancing user activities is ensuring that the subscribed services are actually being used to a desired extent. For example, a subscriber of a service is not likely to consider subscription costs to be worthwhile if it becomes apparent to the subscriber that he or she has not been actually using the service to a sufficient extent. Alternatively, a subscriber may remain loyal to the service provider, or become even more actively involved in the subscription activities, if the subscriber is satisfied with the amount of actual use.

In the context of apparel subscription applications, in particular, users may be unaware of how many different items of clothing they are entitled to rent (e.g., have "closeted" at any given time). Similarly, they may not realize what types of clothing or other articles they could be renting or closeting to get the most value possible out of their apparel subscription. In addition, users may be unaware of promotions, rewards, and other incentives that they might be entitled to for various combinations of closeted clothing and other articles.

The present disclosure is directed to overcoming one or more of the shortcomings described above. This background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for providing electronic closet recommendation engines and displays of an apparel subscription application are disclosed.

In an aspect, a computer-implemented method for providing electronic recommendation engines and displays of an apparel subscription application may comprise determining a status of the user as being a valid user of electronic closet recommendation engines and displays of an apparel subscription application; determining, if the user is a valid user, a presence of apparel data in an assistant section of an electronic record corresponding to the user in a database of the electronic closet recommendation engines and displays; launching the assistant section of a user interface of the apparel subscription application, if the apparel data is present in the assistant section of the electronic record, wherein the user interface comprises one or more graphical elements displayed on an electronic device of the user; enabling the user to manipulate the one or more graphical elements to make one or more selections based on the apparel data to receive apparel via the apparel subscription application, wherein the one or more selections comprise try-then-buy, returned favorites, below-closet-minimum, next-box-prepared, or next-box-shipped; updating the apparel data based on the one or more selections made by the user; and analyzing the updated apparel data to display one or more suggestions to the user in the assistant section of the user interface.

In some embodiments, the computer-implemented method may further comprise launching a first phase of the user interface if the user is a non-valid user. In some embodiments, the first phase of the user interface may not comprise the assistant section. In some embodiments, the valid user may be a user who pays a fee or on free trial. In some embodiments, the computer-implemented method may further comprise determining, if the apparel data is not present in the assistant section, a presence of apparel data in an at-home section of an electronic record corresponding to the user in a database of the electronic closet recommendation engines and displays. In some embodiments, the computer-implemented method may further comprise launching the at-home section of the user interface of the apparel subscription application, if the apparel data is present in the at-home section of the electronic record. In some embodiments, the computer-implemented method may further comprise launching an on-rack section of the user interface of the apparel subscription application, if the apparel data is not present in the at-home section of the electronic record.

In some embodiments, the computer-implemented method may further comprise enabling the user to manipulate the one or more graphical elements to make one or more selections based on the apparel data to receive apparel via the apparel subscription application, wherein the one or more selections comprise try-then-buy, returned favorites, or return notification. In some embodiments, the computer-implemented method may further comprise updating the apparel data based on the one or more selections made by the user. In some embodiments, the computer-implemented method may further comprise launching an on-hold section of the user interface of the apparel subscription application, if the on-hold section is selected by the user or determined by the electronic closet recommendation engines and displays. In some embodiments, the computer-implemented method may further comprise enabling the user to manipulate the one or more graphical elements to move one or more articles from the on-hold section to the on-rack section.

In some embodiments, the computer-implemented method may further comprise enabling the user to manipulate the one or more graphical elements to move one or more articles from the on-rack section to the on-hold section. In some embodiments, the computer-implemented method may further comprise enabling the user to manipulate the one or more graphical elements to delete one or more articles from the on-hold section. In some embodiments, the non-valid user is a user who may be a guest of, cancels, is a past payment delinquent of, or is a delinquent of the apparel subscription application. In some embodiments, the updating step may comprise obtaining the apparel data from the assistant section based on a plurality of updating events.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6A shows an exemplary promotions card layout presented on a user interface when a returned favorites selection is selected or determined.

FIG. 6B shows another exemplary rewards redemption card layout presented on a user interface when a returned favorites is selected or determined.

FIG. 6C shows another exemplary card layout presented on a user interface when a returned favorites selection is selected or determined.

FIG. 7A shows exemplary card layouts presented on a user interface when a next-box-prepared selection is selected or determined.

FIG. 7B shows other exemplary card layouts presented on a user interface when a next-box-prepared selection is selected or determined.

FIG. 7C shows exemplary card layouts presented on a user interface when a next-box-shipped selection is selected or determined and a user is prompted to optionally track shipment of the box.

FIG. 15 shows another exemplary flow chart of methods for providing electronic closet recommendation engines and displays for a user of an apparel subscription application.

DETAILED DESCRIPTION OF EMBODIMENTS

Figure 1:
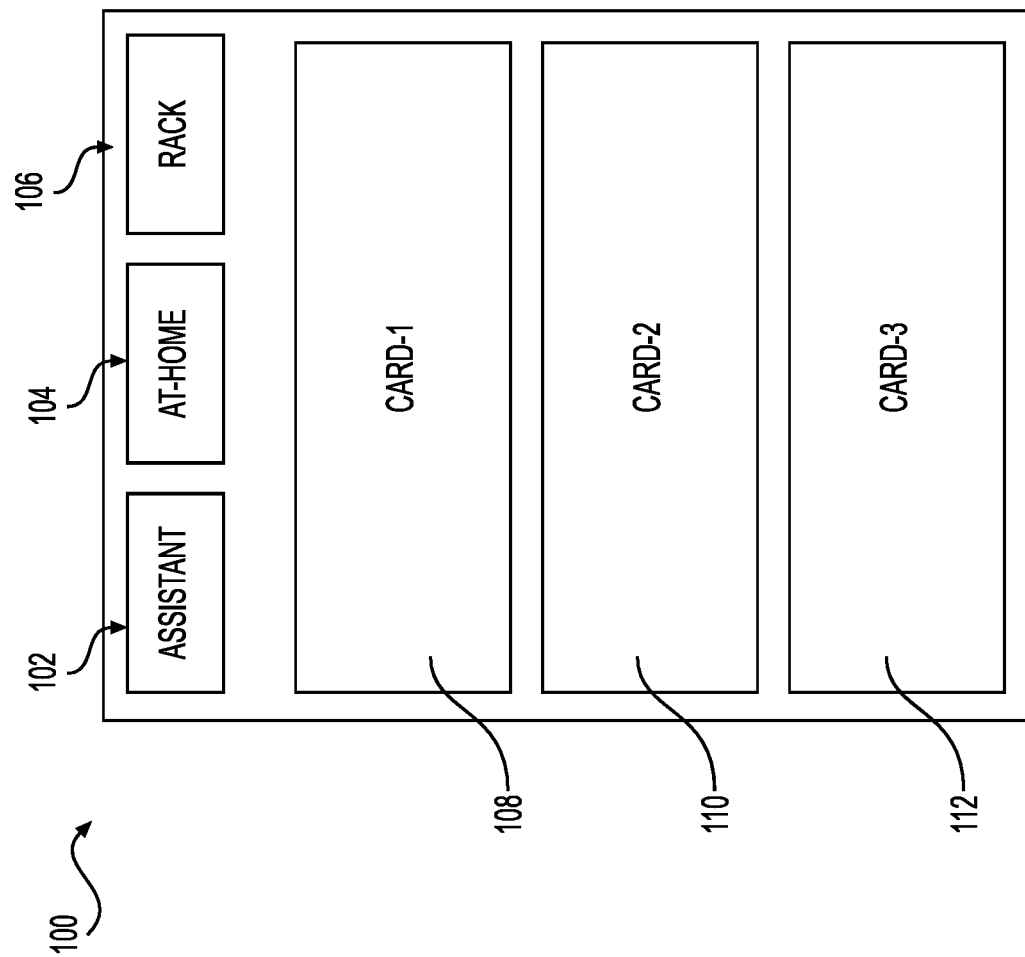
FIG. 1 shows an example of a user interface of an apparel subscription application having electronic closet recommendation engines and displays of an apparel subscription application.

As described above, there is a desire to make users (e.g., subscribers, online shoppers, etc.) more loyal to a service provider and to be more involved in apparel subscription activities. Accordingly, systems and methods are disclosed for helping users to choose more suitable articles and to make smarter rental and/or purchases of these articles. In some embodiments, purchases may comprise any actions related to transactions between the user and the articles, such as buying the articles, renting the articles, or renting and then buying the articles. Such systems and methods may comprise electronic closet recommendation engines and displays that help users obtain more service value in a number of ways. Systems and methods for providing electronic closet recommendation engines and displays for a user may help the user to revamp his/her closet experience, including improving wearability, increasing rent and/or purchase opportunities, increasing order transparency, improving education about service usage, and achieving easier discovery of new or trending articles. Systems and methods for providing electronic closet recommendation engines and displays for a user may comprise performing user testing sessions, demonstrating prototypes of the systems to a selected number of users, and updating the systems and methods based on the feedback from a selected number of users.

For instance, an electronic closet recommendation engine may alert a user to add articles to an electronic closet of a user interface when the user does not have enough items present in the electronic closet. In another example, if some articles presented in an electronic closet are not in a user's size (e.g., either too small or too large), an electronic closet recommendation engine may suggest a user to correct the sizes. In yet another example, if some articles presented in an electronic closet are out of season, an electronic closet recommendation engine may suggest that a user delete these articles from the electronic closet. Furthermore, if a price of a user's article presented in an electronic closet has decreased, an electronic closet recommendation engine may suggest the user to rent and/or purchase it. Additionally, an electronic closet recommendation engine may learn that a user prefers a brand and, when new styles of the brand have been launched, the electronic closet recommendation engines and displays may suggest the user to choose the new styles.

In accordance with the present disclosure, electronic closet recommendation engines and displays may configure one or more computer processors to automatically analyze updated apparel data, continually determine optimal solutions based on the automatic analysis, and dynamically display one or more unique suggestions to the user. The apparel data may comprise any data, information, or knowledge related to the electronic closet recommendation engines and displays. The apparel data may comprise any data, information, or knowledge collected, processed, or stored by the electronic closet recommendation engines and displays. Such an automatic analysis function may be performed by one or more computer processors configured to uniquely train one or more neural networks, and use the trained one or more neural networks to automatically provide optimized data specifically customized for each particular user. For example, a neural network may learn specific relationships between an input data set (e.g., user's clothes selection, user's purchase history, etc.) and a target data set (e.g., one or more articles that a user may be interested in), and automatically provide uniquely customized, user-specific, and optimal solutions produced using specific machine learning rules. For example, the automatic analysis function of the electronic closet recommendation engines and displays may present items of clothes suitable for a user in one month, accessories that match the user's clothes, notifications to a user that he/she needs to buy more articles, a correct size of an article that a user wants to buy, a discount on an article that a user has been interested in for a long time, or any seasonal fashion information, etc.

Such rule-based machine learning algorithms that uniquely train one or more neural networks, combined with an integrated practical application of periodically and/or dynamically providing user-specific suggestions based on the trained neural networks, produce unconventional, unique, and rule-based automations which necessarily achieve technological improvements (e.g., improved performance of a server system or enhanced efficiency in usage of bandwidth/memory resulting from transactions that follow optimal, intelligent recommendations) through the particular automation techniques described more in detail below. The unconventional and unique aspects of these automation processes represent a sharp contrast to merely providing a well-known or routine environment for performing a mental process.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

As used herein, the term "computer" may refer to any electronic device or devices, including those having capabilities to be utilized in connection with a decentralized authentication system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, an electronic pager or any other computing and/or communication device specifically configured to perform one or more functions described herein.

As used herein, the term "network" may refer to any type of network or networks, including those capable of being utilized in connection with a decentralized authentication system described herein, such as, for example, any public and/or private networks, including, for instance, the Internet, an intranet, or an extranet, any wired or wireless networks or combinations thereof.

As used herein, the term "user interface" may refer to any suitable type of device, connection, display and/or system through which information may be conveyed to and received from a user, such as, without limitation, a monitor, a computer, a graphical user interface, a terminal, a screen, a keyboard, a touchscreen, a biometric input device that can include a microphone and/or camera, a telephone, a personal digital assistant, a smartphone, or an interactive television.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. Unless stated otherwise, the term "exemplary" is used in the sense of "example," rather than "ideal." Words using the singular or plural number also include the plural or singular number respectively. Additionally, the words 'herein,' 'hereunder,' 'above,' 'below,' and words of similar import refer to this application as a whole and not to any particular portions of this application.

The disclosed embodiments will now be described with reference to the appended drawings, which are provided for purposes of illustration without being construed as being limited hereto. FIG. 1 shows an example of a user interface of an apparel subscription application having electronic closet recommendation engines and displays of an apparel subscription application (e.g., a second phase, described elsewhere herein). As shown in FIG. 1, the user interface 100 may display a set of tabs or section buttons 102-106 on the top of the user interface. The section buttons 102-106 may enable a user to choose which section (assistant section, at-home section, or on-rack section) to view. In this example, the user interface 100 displays a plurality of cards 108-112 below the section buttons 102-106. The plurality of cards 108-112 may enable the user to view different information presented in the cards. A card may be considered any type of discrete section of data, such as apparel data, recommendation data, or user data etc. relating to the tab 102-106 in which the card(s) are displayed. For example, when the assistant tab 102 is displayed, cards 108-112 may display a plurality of apparel assistant recommendations. When the at-home tab 104 is displayed, cards 108-112 may display a plurality of at-home apparel items. When the rack tab 106 is displayed, cards 108-112 may display a plurality of apparel items on the user's rack. In any tab or section 102-106, each card 108-112, may be a display of an apparel item, a recommendation, a promotion, or any quantity or combination thereof.

Figure 2:
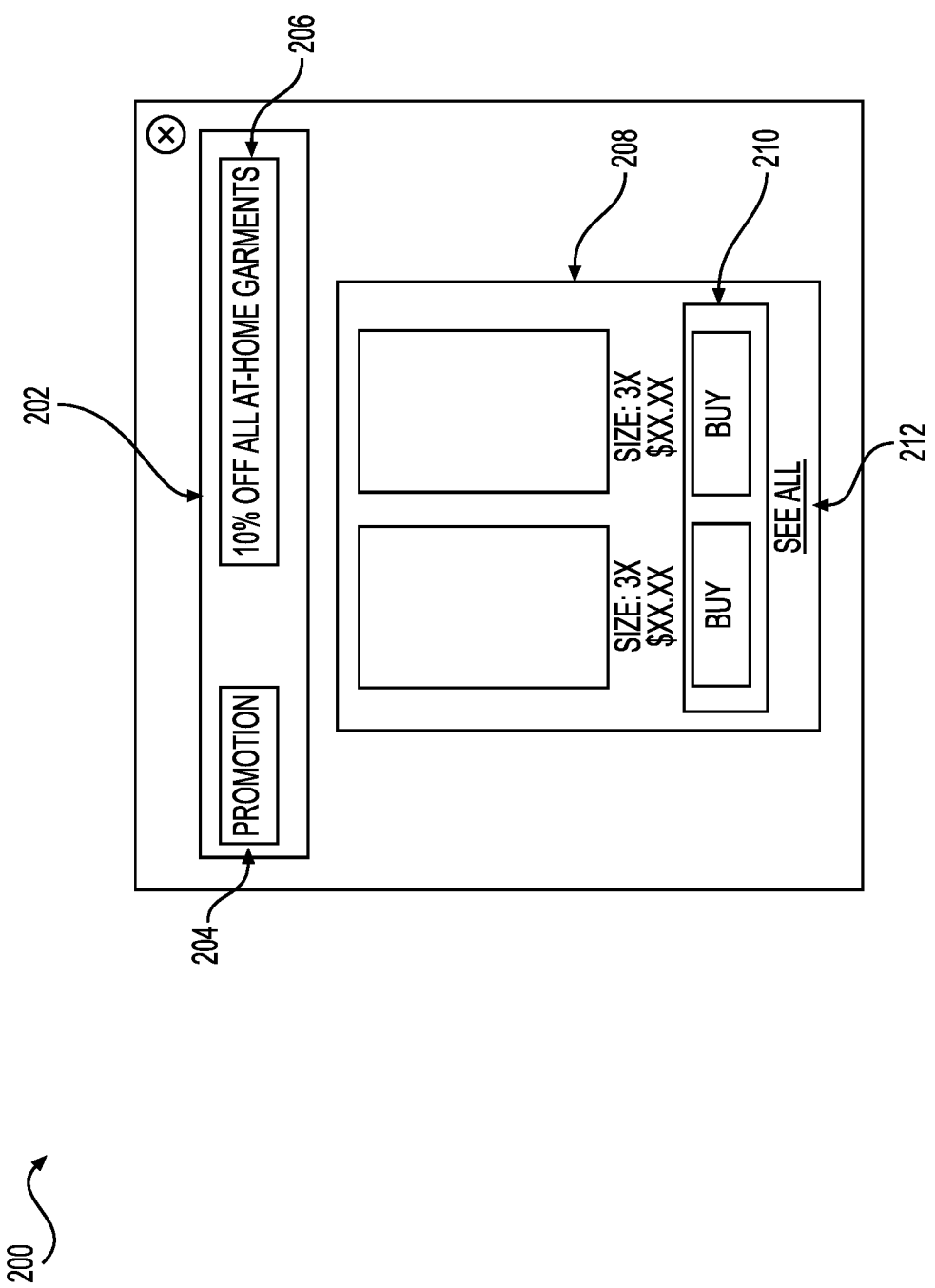
FIG. 2 shows an exemplary template of a card presented in a user interface of an apparel subscription application.

FIG. 2 shows an exemplary template of a card 200 presented in a user interface of an apparel subscription application. As shown in FIG. 2, the template of the card 200 may comprise a header 202 with a title 204 and a description 206, and content 208 with primary call to action (CTA) buttons 210 and secondary CTA buttons 212. In this example, the title 204 and the description 206 are presented in the header 202. In other embodiments, the title 204 and the description 206 may be presented outside the header 202. The title 204 and description 206 may comprise any information regarding an article, such as a discount or reward when an article is rented and/or purchased. In the example, the primary CTA buttons 210 and the secondary CTA buttons 212 are presented in the content 208. In other embodiments, the primary CTA buttons 210 and the secondary CTA buttons 212 may be presented outside the content 208. The content 208 may comprise any information regarding an article, such as images and prices of an article. The primary CTA buttons 210 and the secondary CTA buttons 212 may enable a user to perform any actions regarding an article, such as buying or viewing of an article.

Figures 3A, 3B:
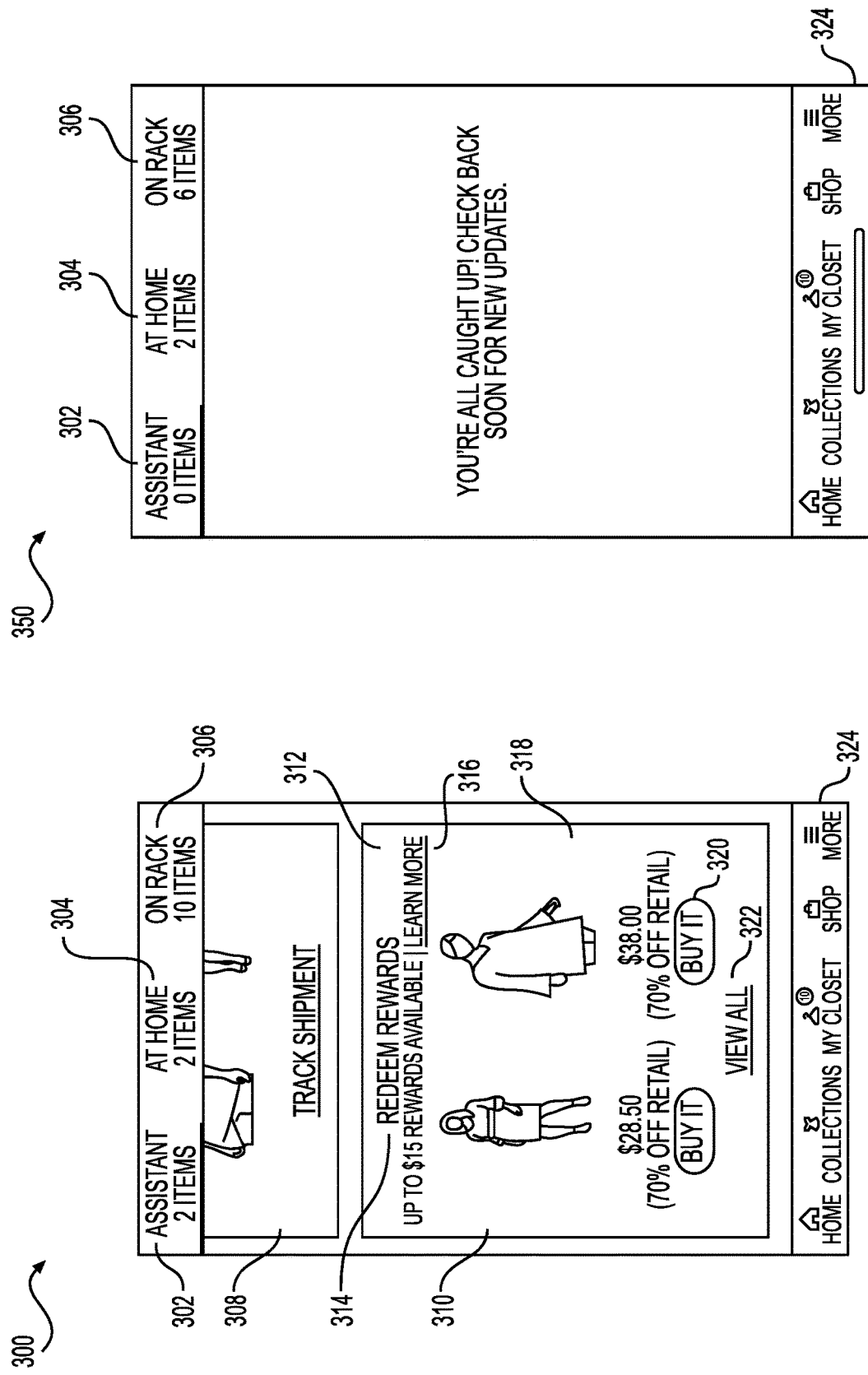
FIG. 3A shows an example of a user interface of an apparel subscription application with an assistant section when the assistant section has content.
FIG. 3B shows an example of a user interface of an apparel subscription application with an assistant section when the assistant section has no new content for display.

FIG. 3A shows an example of a user interface 300 of an apparel subscription application with an assistant section when the assistant section has content. The user interface 300 displays an assistant section 302, at-home section 304, and on-rack section 306 on the top of the user interface 300. When a user clicks on the assistant section 302, a plurality of cards 308-310 may be presented below the sections 302-306. As shown in FIG. 3A, the card 310 may comprise a header 312 with a title 314 showing that a user can redeem rewards and a description 316 showing (e.g., via a link to another section) the details of the reward. The card 310 may also comprise content 318 showing images and prices of articles, primary CTA buttons 320 enabling a user to buy articles, and secondary CTA buttons 322 enabling a user to view all articles with redeemable rewards. One or more action buttons 324 may be presented at the bottom of the user interface 300. The one or more action buttons 324 may comprise, for example, a home button, a collection button, a closet button, a shop button, and a more selection button. By clicking on the closet button, a user may be able to load the exemplary user interface 300, including sections (e.g., assistant section 302, at-home section 304, on-rack section 306, etc.) associated with a user's electronic closet.

FIG. 3B shows an example of a user interface 350 of an apparel subscription application with an assistant section when the assistant section has no content. The user interface 350 may similarly display an assistant section 302, at-home section 304, and on-rack section 306 on the top of the user interface 350. In this example, since there is no content in the assistant section 302, when a user clicks on the assistant section button 302, an exemplary text—"You're all caught up! Check back soon for new updates"— is shown. One or more action buttons 324 may be presented at the bottom of the user interface 350. The one or more action buttons 324 may comprise a home button, a collection button, a closet button, a shop button, and a more selection button.

Figure 4:
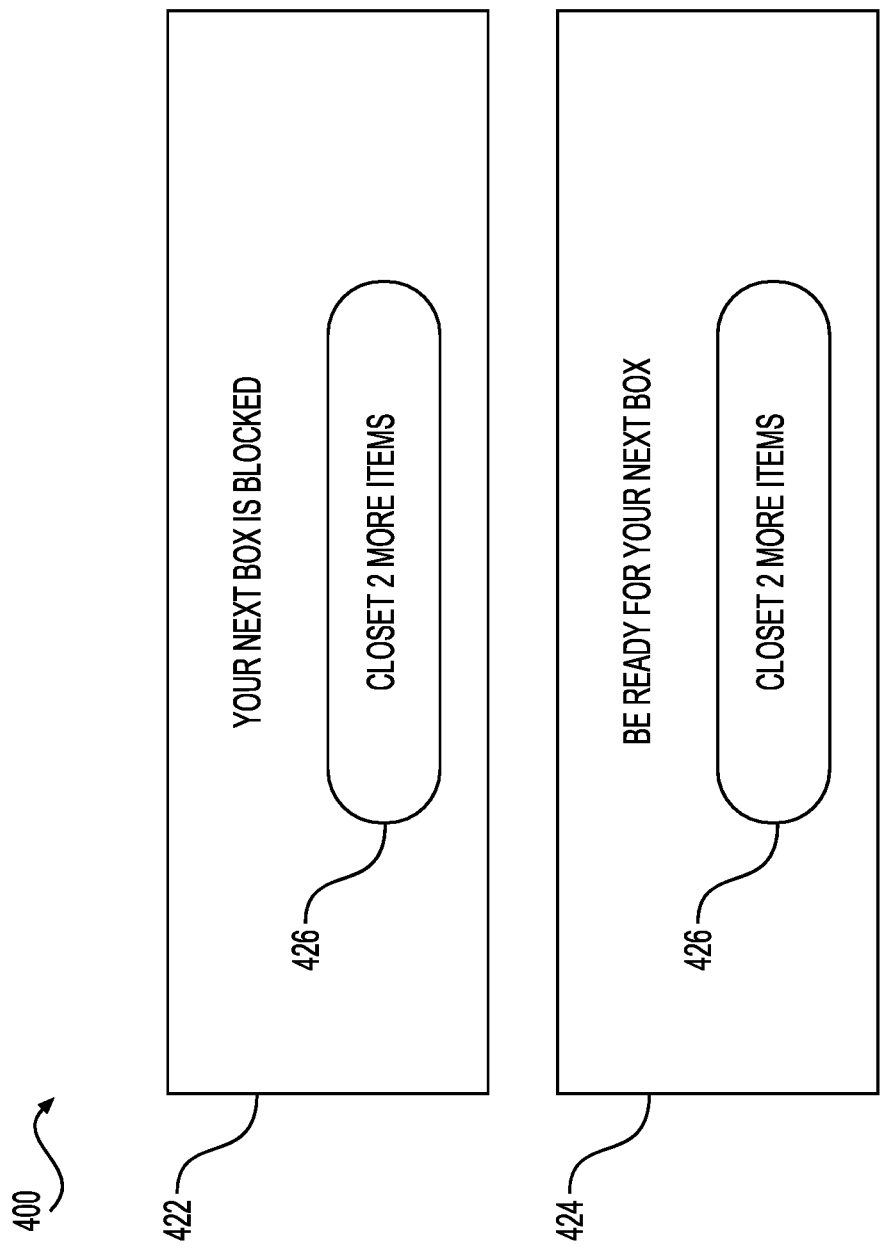
FIG. 4 shows exemplary card layouts presented on a user interface of box shipment information cards when a below-closet-minimum selection is selected or determined.

Details of one or more selections that a user can make or electronic closet recommendation engines and displays can determine, including try-then-buy, returned favorites, below-closet-minimum, next-box-prepared, or next-box-shipped, are further described below. In some embodiments, the one or more selections may be made by a user through the user's interaction with an electronic device. In other embodiments, the one or more selections may be determined for a user through electronic closet recommendation engines and displays. Details of determining the one or more selections via electronic closet recommendation engines and displays are described elsewhere herein. For example, FIG. 4 shows exemplary card layouts presented on a user interface when a below-closet-minimum selection is selected or determined. As shown in the FIG. 4, the below-closet-minimum selection 400 may comprise two layouts. The first layout may be an open replenishment identifier (RID) layout 422, and the second layout may be a non-open RID layout 424. An RID may be, for example, an identifier that is generated in response to detecting that a user has an open slot and is eligible for a shipment of rent and/or purchased articles. The open RID layout 422 may be shown when the number of articles that a user plans to rent and/or purchase is lower than a threshold number and the user is not eligible for a shipment of articles. The non-open RID layout 424 may be shown when the number of articles that a user plans to rent and/or purchase is lower than a threshold number but the user is eligible for a shipment of articles. The threshold number may be at least 2, 3, 4, 5, 6, 7, or more. In some embodiments, the threshold number may be at most 7, 6, 5, 4, 3, or less.

Both the open RID layout 422 and the non-open RID layout 424 may comprise a button 426 with an exemplary text "closet x more Items," wherein "x" represents the number of articles that may be added. The content of the open RID layout 422 may comprise information that the user's shipment is blocked because the number of articles that a user plans to rent and/or purchase is less than a threshold number. In this case, a user may add more articles in order to unblock the shipment. The threshold number may be a default number set by an apparel subscription application or a number set by a user. The content of the non-open RID layout 424 may comprise notification to a user to be ready for his/her next shipment. The button 426 may redirect a user to a collection section. The collection section may show information regarding articles that the user has not yet viewed, rented, or purchased. A decision of showing an open RID layout or a non-open RID layout may be set based on one or more APIs (e.g., a client node API).

Figure 5B:
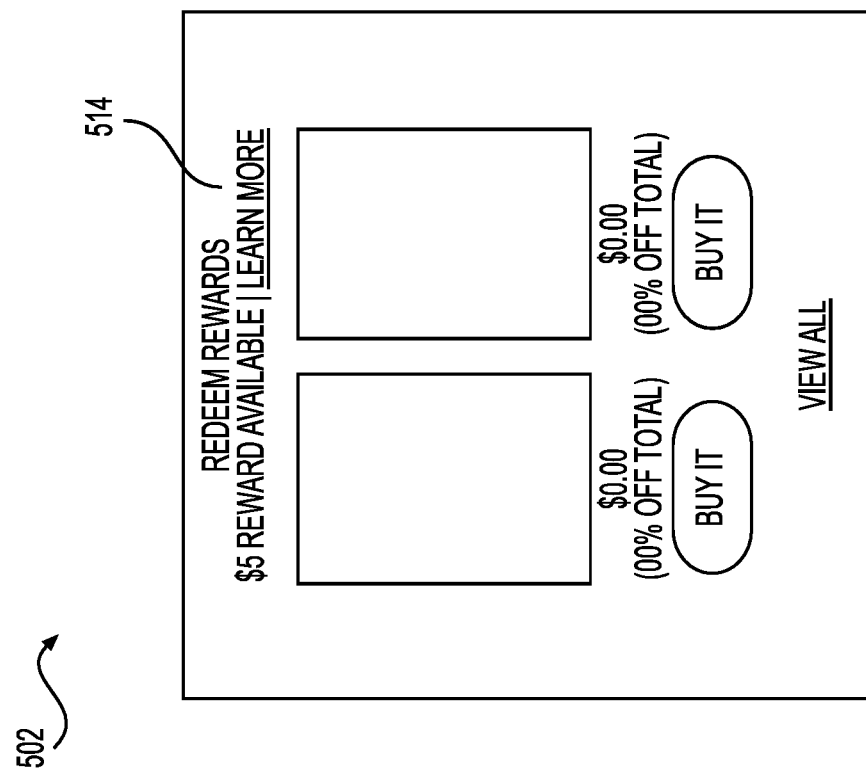
FIG. 5B shows another exemplary reward redemptions card layout presented on a user interface when a try-then-buy selection is selected or determined.
Figure 5A:
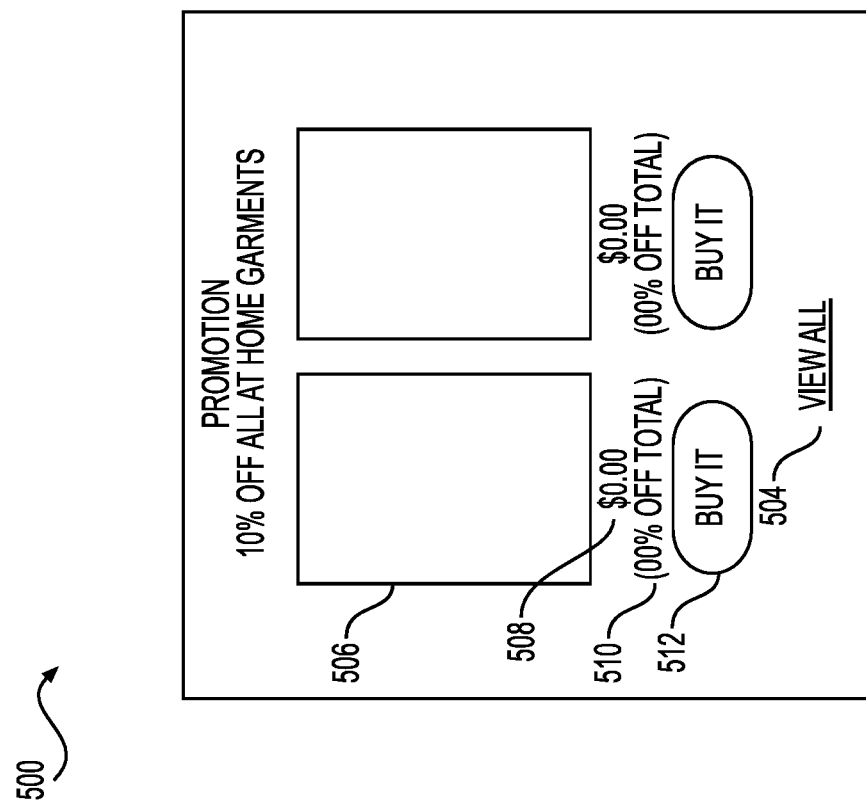
FIG. 5A shows an exemplary promotions card layout presented on a user interface when a try-then-buy selection is selected or determined.

FIGS. 5A and 5B show exemplary card layouts presented on a user interface when a try-then-buy selection is selected or determined. As shown in the FIGS. 5A and 5B, the try-then-buy selection may comprise two layouts. The first layout may be a discount or promotions layout 500 and the second layout may be a reward redemptions layout 502. The discount or promotions layout 500 may comprise information regarding any articles that are on discount or that have one or more promotions associated with them. The reward layout 502 may comprise information regarding any articles with options of allowing a user to redeem rewards. Details of both the promotions layout 500 and the reward layout 502 may be consistent with an exemplary template of card described elsewhere herein. One layout may be visible to a user at a time. For instance, when both the promotions layout 500 and the reward layout 502 are available to be shown to a user (e.g., apparel data are recorded in one or more databases associated with both the promotions layout and reward layout), the promotions layout, instead of the reward layout, may be shown to a user on a user interface. In other embodiments, when both the promotions layout 500 and the reward layout 502 are available to be shown to a user, the reward layout, instead of the promotions layout, may be shown to a user on a user interface.

As shown in FIGS. 5A and 5B, two articles are shown in each layout. When more than two articles are available, two articles that are most recently shipped to a user may be shown in a layout. To check all available articles, a user may click a tab with an exemplary text "View All" 504. The tab "View All" 504 may direct a user to an at-home section. When one article is available, the available article may be shown in the center of a card layout. For each article presented in a card, an image of the article 506, a price 508, a discount 510, and a purchasing button 512 may be presented. The purchasing button 512, when activated, may initiate one or more functions for a user to complete a rent and/or purchase transaction. By clicking on an image of an article, a user may navigate to an existing product page. After each rent and/or purchase, a rented and/or purchased article may be removed, refreshed, and/or updated with a new article. When a user rents and/or purchases an article presented in a card, the card may be revised. If there is no article to be presented in a card to a user after a rent and/or purchase, the empty card may be removed. After each rent and/or purchase, an assistant section may be refreshed. In another embodiment, after all discounted articles are rented and/or purchased and no apparel data is available in a promotions layout, a reward layout may be presented to a user if articles with options of allowing a user to redeem rewards are available. In this situation, the reward layout may comprise a tab with an exemplary text "Learn More" 514. The tab "Learn More" 514 may direct a user to a section with information about how to earn rewards.

The decision of showing either a promotions layout or rewards layout may be set based on one or more Application Programming Interfaces (APIs, such as, for example, a client node API). The one or more APIs are described elsewhere herein. A plurality of events may lead to displaying a promotions layout. The plurality of events may comprise identifying a discount on at least one article in an at-home section. In this situation, the discount may be for specific articles, rather than for all articles in the at-home section, and such specific articles may be shown in the promotions layout. The plurality of events may further comprise an article being identified as purchasable (e.g., purchase prices are available). The plurality of events may further comprise an identification that a user has received an article (e.g., the article has been delivered by a mail delivery service or five days have passed since a shipment of the article, whichever is earlier). In some cases, all the plurality of events may need to occur in order to display a promotions layout. In other cases, in order to display a promotions layout, not all the plurality of events may need to occur.

A plurality of events may lead to displaying a reward layout. The plurality of events may comprise determining that a user has rewards available to redeem. The plurality of events may comprise determining that maximum applicable rewards are shown (e.g., if the user has $15 rewards then a text with "Up to $15 rewards available" is shown). The plurality of events may comprise determining that at least one article in an at-home section is purchasable. The plurality of events may comprise determining that a user has received an article (e.g., an article has been delivered by a mail delivery service or five days have passed since a shipment of the article, whichever is earlier). In some cases, all the plurality of events may need to occur in order to display a reward layout. In other cases, in order to display a reward layout, not all the plurality of events may need to occur.

FIGS. 6A, 6B, and 6C show exemplary card layouts presented on a user interface when a returned favorites selection is selected or determined. As shown in FIGS. 6A, 6B, and 6C, the returned favorites selection may comprise three layouts. The first layout may be a promotions layout 602, the second layout may be a reward layout 604, and the third layout may be a new additions layout 606. The promotions layout 602 may comprise information regarding any articles that are on discount. The reward layout 604 may comprise information regarding any articles with options of allowing a user to redeem rewards. The new additions layout 606 may comprise information regarding articles that are added because they are returned favorites (e.g., articles that a user previously purchased and gave high ratings). Views of the promotions layout 602, the reward layout 604, and the new additions layout 606 may be consistent with an exemplary template of card described elsewhere herein. One layout may be visible to the user at a time. When all layouts are available, an order of presenting the layouts to a user may be, for example: 1) a promotions layout 602, 2) a new additions layout 606, and 3) a rewards layout 604. For instance, when a promotions layout, a new additions layout and a reward layout are available to be shown to a user (e.g., apparel data is presented in an electronic record of a database associated with a promotions layout, reward layout, and new additions layout), the promotions layout may be shown to a user on a user interface.

As shown in the FIGS. 6A, 6B, and 6C, two articles may be shown in each layout. When more than two articles are available, two purchased/rented and/or previously viewed articles may be visible. To check all available articles, a user may click a tab with an exemplary text "View All" 608. The tab "View All" 608 may direct a user to an existing returned favorites section. If the purchased/rented and/or previously viewed articles are not available, two recommended articles may be shown in a card to a user on a user interface. The recommended articles may be one or more articles predetermined or predesignated to be default articles for recommendation, or one or more articles determined through one or more algorithms, including machine learning algorithms. When one article is available, the available article may be shown in, for example, the center of a card. For each article presented in a card, an image of the article 610, a price 612, a promotion 614, a rating 616 and a purchasing button 618 may be presented. The purchasing button 618 may enable a user to complete a rent and/or purchase. By clicking on an image of an article 610, a user may be directed to a webpage with more information regarding the article. After each rent and/or purchase, the rented and/or purchased article may be removed, refreshed, and/or updated with a new article. When a user rents and/or purchases an article presented in a card, the card may be revised. In other cases, if there is no article to be presented in a card to a user after a rent and/or purchase, the empty card may be removed. After each rent and/or purchase, an assistant section may be refreshed. In another embodiment, after all discounted articles are rented and/or purchased and no apparel data is available in a promotions layout, a reward layout may be presented to a user if articles with options of allowing a user to redeem rewards are available. In this situation, the reward layout may comprise a tab with an exemplary text "Learn More" 605. The tab "Learn More" 605 may direct a user to a section with information about how to earn rewards.

A decision of showing a promotions layout, rewards layout, or new additions layout may be set based on one or more APIs (e.g., a client node API). A plurality of events may lead to displaying a promotions layout. The plurality of events may comprise determining that a user has returned favorite articles available, through rented and/or purchased articles, previously viewed articles or recommended articles. The plurality of events may comprise determining that there is a discount on returned favorite articles and the discount may be on specific articles or all articles. In some cases, all the plurality of events may need to occur in order to display a promotions layout. In other cases, in order to display a promotions layout, not all the plurality of events may need to occur.

A plurality of events may lead to displaying a reward layout. The plurality of events may comprise determining that a user has returned favorite articles available, through rented and/or purchased articles, previously viewed articles or recommended articles. The plurality of events may comprise determining that there are rewards to redeem. In some cases, all the plurality of events may need to occur in order to display a reward layout. In other cases, in order to display a reward layout, not all the plurality of events may need to occur.

A plurality of events may lead to displaying a new additions layout. The plurality of events may comprise determining that a user has new returned favorite articles to be added. The plurality of events may comprise determining use of existing logic, such as a previously rented article may become available for rent and/or purchase or an item similar to a rented article become available. In some cases, all the plurality of events may need to occur in order to display a new additions layout. In other cases, in order to display a new additions layout, not all the plurality of events may need to occur.

FIGS. 7A-7C show exemplary card layouts presented on a user interface when a next-box-prepared selection is selected or determined. As shown in FIG. 7A, the next-box-prepared selection 700 may comprise two layouts. The first layout may be a viewing layout 702, and the second layout may be a prioritizing layout 704. The viewing layout 702 may be shown if a user has prioritized articles. The viewing layout 704 may comprise a call to action (CTA) button 706 (e.g., with an exemplary text "view your prioritized items"). The prioritizing layout 704 may be shown if the user has not prioritized articles, and the prioritizing layout may comprise a CTA button 708 (e.g., with an exemplary text "prioritize your rack items."). In each of the layouts, an exemplary text 710 (e.g., "We'll let you know when your box is shipped. You can still prioritize item") may be shown to a user. Both the viewing layout 702 and priority layout 704 may direct a user to an on-rack section with prioritized articles on the top. One layout may be visible to a user at a time. Any information associated with a CTA button may be received from one or more APIs. The number of articles that a user plans to rent and/or purchase may be above a threshold number so the user may have an open RID that detects the user is eligible for a shipment of articles (e.g., an open RID signals that some articles are getting prepared).

FIG. 7B shows other exemplary card layouts presented on a user interface when a next-box-prepared selection is selected or determined. As shown in the FIG. 7B, the next-box-prepared selection 720 may comprise two layouts. The first layout may be a viewing layout 722, and the second layout may be a prioritizing layout 724. The viewing layout 722 may be shown to a user if the user has prioritized articles. The viewing layout 724 may comprise a CTA button 726 (e.g., with an exemplary text "view your prioritized items."). The prioritizing layout 724 may be shown to a user if the user has not prioritized articles. The prioritizing layout may comprise a CTA button 728 (e.g., with an exemplary text "prioritize your rack items."). In each of the layouts, instead of a text 710 as shown in FIG. 7A, images of articles 730 may be shown. Both the viewing layout 722 and priority layout 724 may direct a user to an on-rack section with prioritized article on the top. One layout may be visible to a user at a time.

FIG. 7C shows exemplary card layouts presented on a user interface when a next-box-shipped selection is selected or determined. As shown in the FIG. 7C, a card layout 740 comprises a header 742 with a title text "your next box" 744, and a description text "2 items are on their way" 746, content 748 with images of articles that have been shipped, and a CTA button 750 that enables a user to track the shipment. The next-box-prepared selection may comprise different layouts based on the number of shipments. For instance, when there is more than one shipment, more than one card layouts may be presented, and each of the card layouts represents one of the shipments. In some embodiments, when more than two articles are in one shipment, the more than two articles may be shown as stacked. In another embodiment, when a single article is in one shipment, the single article may be shown in the center of a card layout. Additionally, a CTA button 750 (e.g., with an exemplary text "track shipment") may be shown at the bottom of the card layout 740. The CTA button 750 may direct a user to a mail delivery website to track shipment information.

A plurality of events may lead to displaying one or more card layouts associated with a next-box-shipped selection. The plurality of events may comprise determining that a user has a shipment that has been shipped. The plurality of events may comprise determining that a shipment has not been delivered yet and 5 days have not passed since the shipment is shipped. In some cases, all the plurality of events may need to occur in order to display one or more card layouts associated with a next-box-shipped selection. In other cases, in order to display one or more card layouts associated with a next-box-shipped selection, not all the plurality of events may need to occur.

Figure 8:
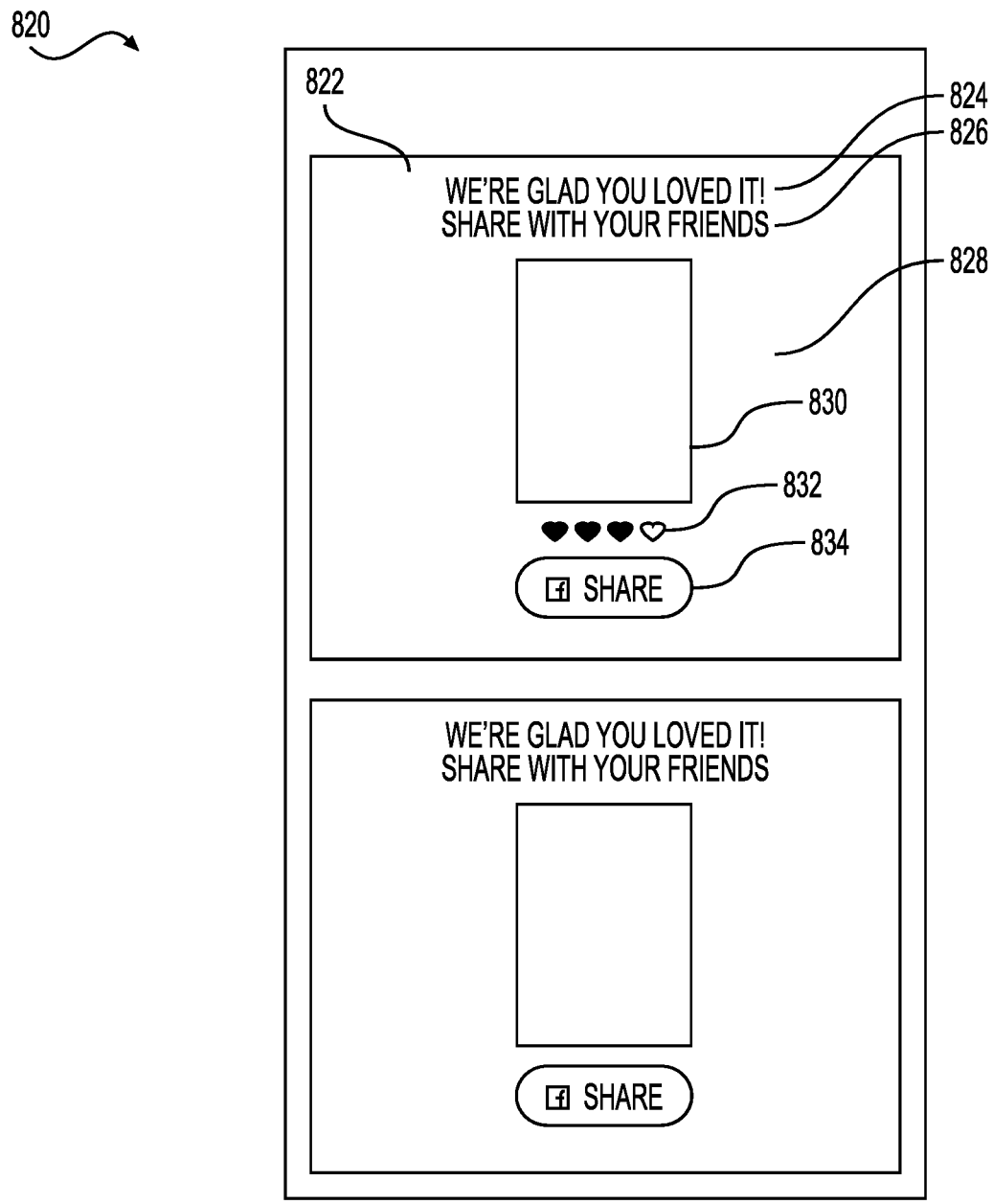
FIG. 8 shows exemplary card layouts presented on a user interface associated with a user's feedback and sharing of the shipment and/or feedback on social media.

FIG. 8 shows exemplary card layouts presented on a user interface associated with a user's feedback and sharing of the shipment and/or feedback on social media. As shown in FIG. 8, a card layout may comprise a header 822 with a title 824 (e.g., with an exemplary text "we're glad you loved it") and a description text 826 (e.g., "share with your friends"), content 828 with images of articles that have been shipped 830, a rating 832, and a sharing button 834 that enables a user to share an article on one or more social networks.

Figure 9:
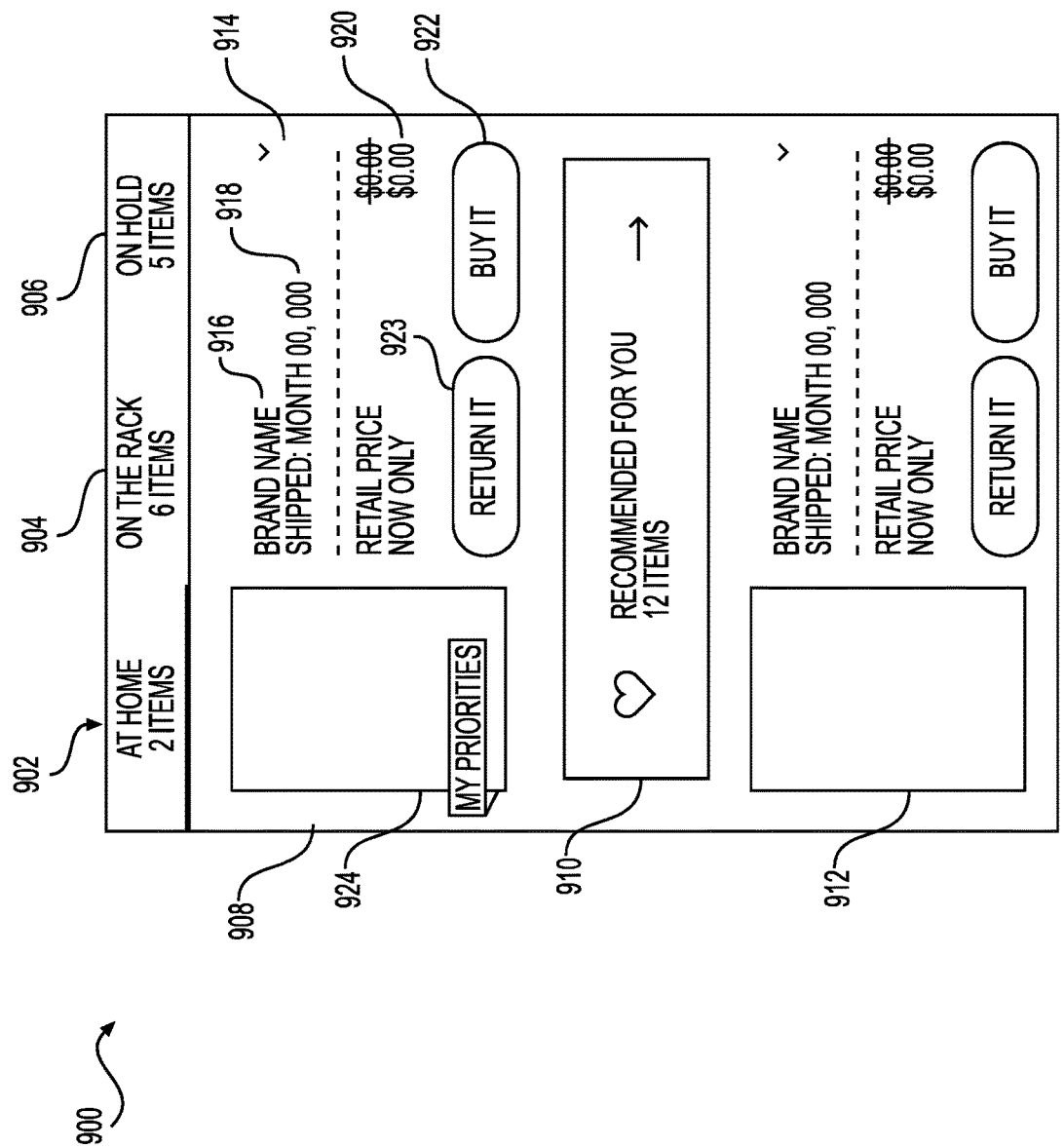
FIG. 9 shows an exemplary user interface of an apparel subscription application comprising "at home," "on the rack," and "on hold" tabs, the "at home" tab displaying options to return or buy one or more at-home items.

FIG. 9 shows an exemplary user interface (or a first phase) of an apparel subscription application comprising "at home," "on the rack," and "on hold" tabs, the "at home" tab displaying options to return or buy one or more at-home items. As shown in FIG. 9, a user interface 900 may display a set of section tabs or buttons 902-906 on the top of the user interface. The sections may comprise an at-home section 902, an on-rack section 904, and an on-hold section 906. The user may be able to choose which section to view by clicking the relevant section tab. The user interface 900 may also comprise a plurality of cards below the section buttons. In this example, the user interfaces 900 displays a plurality of cards 908-912 below the at-home section 902 when the at-home section is selected or determined. The plurality of cards may have different design and enable a user to view different information presented in the cards. For instance, the card 908 comprises a header 914, title 916, description 918, price 920, purchasing button 922, returning button 923, and image of the article 924. One or more action buttons may be presented below the plurality of cards. The one or more action buttons may comprise a home button, collection button, my closet button, shop button, and more selection button.

The first phase may be controlled by a first coordinator and a first view controller. The second phase may be controlled by a second coordinator and a second view controller. The first phase and the second phase may be tested locally. Whether the first phase or second phase is shown to a user may be determined based on a status of a user (e.g., a valid or non-valid user). The launching of the first phase or the second phase may be initiated by an action of a user (e.g., a user taps on a user interface to log-in to electronic closet recommendation engines and displays of an apparel subscription application).

The first view controller may comprise information associated with an at-home section, on-rack section, and on-hold section. The at-home section, on-rack section, and on-hold section may be managed by an at-home view controller, on-rack view controller, and on-hold view controller, respectively. Navigations in the first phase may be controlled by and directed through the first coordinator, and different APIs may be handled by different controllers. All controllers may be responsible for distributing and/or updating apparel data of the at-home section, on-rack section, and on-hold section.

The second view controller may comprise information associated with an assistant section, at-home section, on-rack section, and on-hold section. The assistant section, at-home section, on-rack section, and on-hold section may be managed by an assistant view controller, at-home view controller, on-rack view controller, and on-hold view controller, respectively. Navigations in the second phase may be controlled by and directed through the second coordinator, and different APIs may be handled by different controllers. All controllers may be responsible for distributing and/or updating data of the assistant section, at-home section, on-rack section, and on-hold section. The assistant view controller may be created for an assistant section and based on Model-view-viewmodel (MVVM). Different card layouts of an assistant section may also be built upon MVVM. The second coordinator may utilize MVVM architectural and coordinator patterns. The second coordinator may be responsible for handling navigations and deep links.

Figure 10:
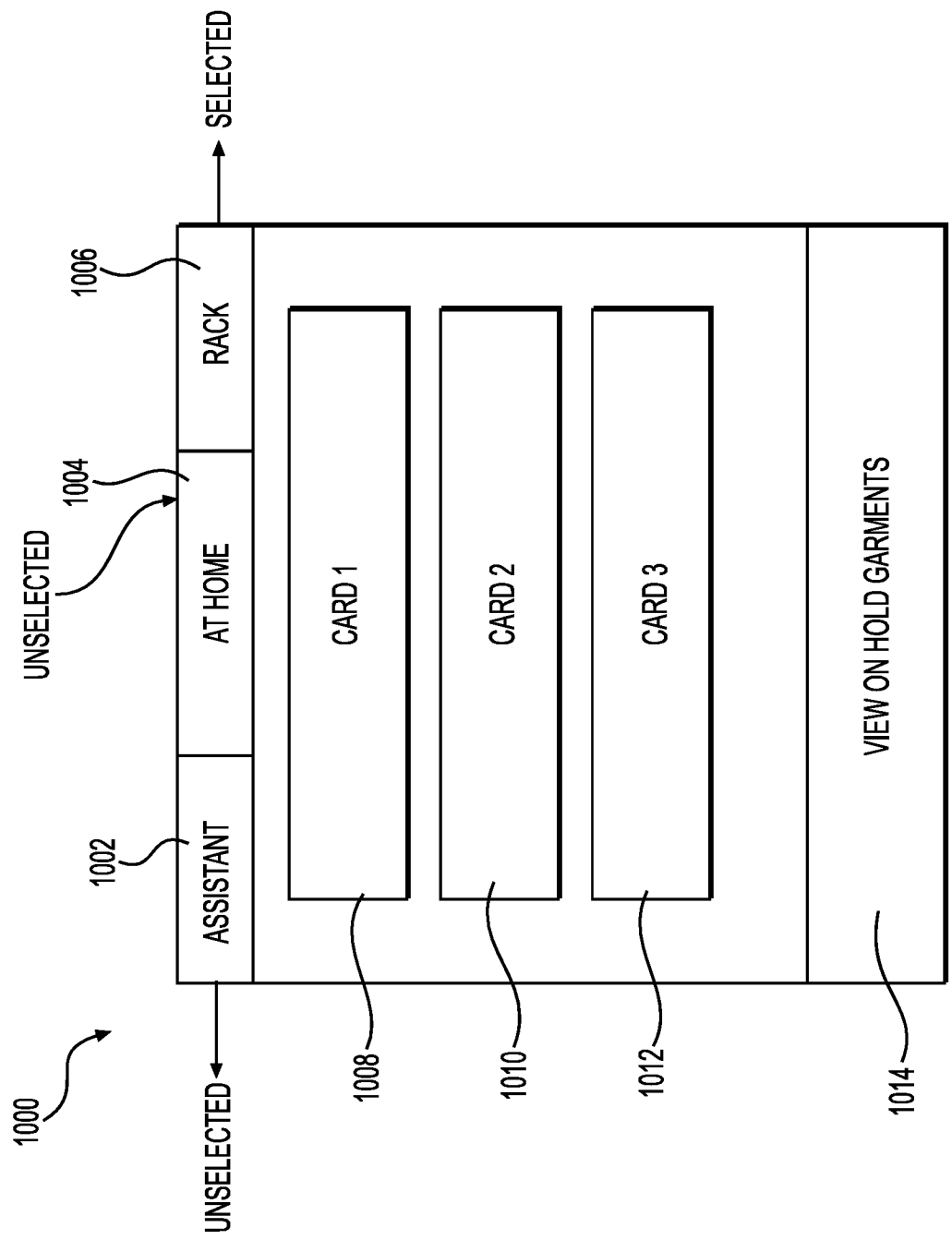
FIG. 10 shows an exemplary user interface of an apparel subscription application comprising "assistant," "at home," and "rack" tabs, where the user is prompted to view on-hold garments when the rack tab is selected or determined.

One or more tests associated with a first phase and a second phase may be conducted. In some tests, a control sample may be the first phase, and a test sample may be the second phase with an on-hold section as a link connected to an on-rack section. FIG. 10 shows an exemplary user interface of an apparel subscription application comprising "assistant," "at home," and "rack" tabs, where the user is prompted to view on-hold garments when the rack tab is selected or determined. As shown in FIG. 10, a user interface 1000 displays a set of section buttons 1002-1006 on the top of the user interface. The section buttons 1002-1006 may enable a user to choose which section (assistant section 1002, at-home section 1004, or on-rack section 1006) to view. In this example, a user selects or electronic closet recommendation engines and displays determine an on-rack section 1006. The user interface 1000 may then display a plurality of cards 1008-1012 below the on-rack section 1006. The plurality of cards may enable a user to view different information presented in the cards. A link to an on-hold section 1014 is presented at the bottom of the user interface. As shown in the FIG. 10, a user may click the link 1014 to go to the on-hold section.

Figure 11:
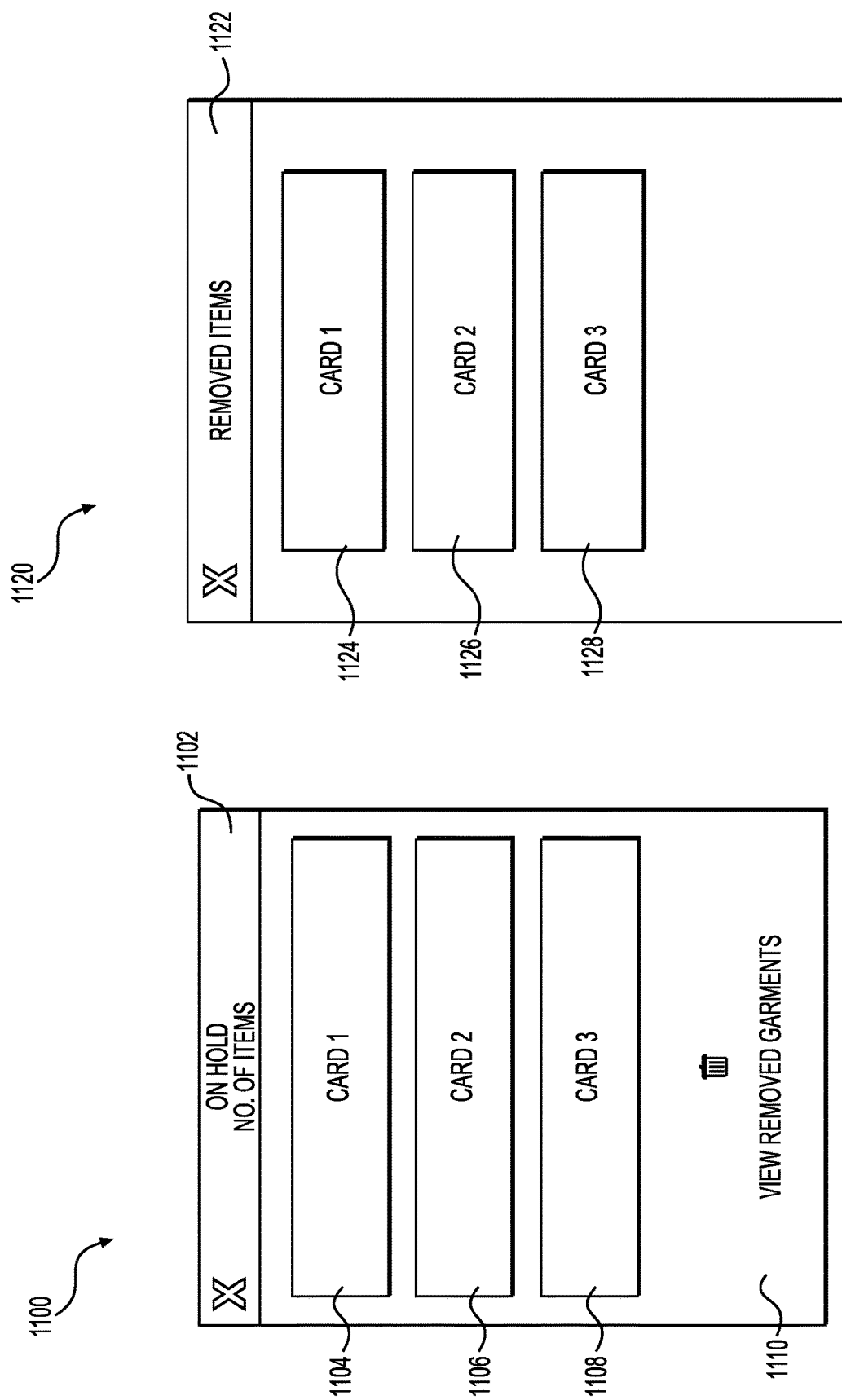
FIG. 11A shows an exemplary on-hold section of a user interface of an apparel subscription application, comprising multiple cards of on-hold items and prompting a user to view removed garments.
FIG. 11B shows an exemplary removed items section of a user interface of an apparel subscription application, comprising multiple cards of removed items.

FIG. 11A shows an exemplary on-hold section of a user interface of an apparel subscription application, comprising multiple cards of on-hold items and prompting a user to view removed garments. An on-hold section 1100 may comprise a header 1102 on the top, a plurality of cards 1104-1108, and a viewing CTA button 1110 at the bottom of the user interface. The header 1102 may comprise any information regarding articles that are on-hold, such as the number of on-hold articles. The viewing CTA button 1110 may enable a user to view removed articles if the user clicks on it. The card may comprise, for example, two CTAs: a first CTA that enables a user to move articles from the on-hold section to an on-rack section, and a second CTA that enables a user to delete articles. The on-hold section 1100 may comprise articles selected but not rented and/or purchased by a user. The on-hold section 1100 may comprise any information associated with a user or a user's closet or articles. Such information may comprise a user's selection of articles, images of the articles, prices of the articles, available discounts for the articles, brands of the articles, or popularity of the articles. The on-hold section may arrange articles according to an order on which they are added in the on-hold section. The on-hold section may enable a user to delete or buy selected articles. The on-hold section may also enable a user to move the articles to other sections, such as an assistant section, at-home section, or on-rack section.

If one article is deleted from the on-hold section, the article may be moved to a removed items section. FIG. 11B shows an exemplary removed items section of a user interface that is configured to be displayed when a user clicks on a viewing CTA button 1110. The removed items section 1120 may comprise a header 1122 on the top and a plurality of cards 1124-1128 below the header. The header 1122 may comprise any information regarding the removed articles or items, such as the number of articles that are removed.

One or more APIs may obtain data from an on-hold section. When one or more articles are moved from an on-hold section to an on-rack section, a data structure in a database (e.g., hash-map) may be updated to immediately move the one or more articles from the on-hold section to the on-rack section through one or more APIs. In other embodiments, when one or more articles are moved from an on-rack section to an on-hold section, a data structure in a database (e.g., hash-map) may be updated to immediately move the one or more articles from the on-rack section to the on-hold section through one or more APIs. When one or more articles are deleted from an on-hold section, a data structure in a database (e.g., hash-map) may be updated to immediately remove the one or more articles from the on-hold section through one or more APIs. If an undo CTA button is clicked, a data structure in a database (e.g., hash-map) may be updated to synchronize closet count with a server through one or more APIs. To obtain removed articles from a server, one or more APIs may be utilized. An on-hold section may comprise recommendations for future rent and/or purchases, and the recommendations may comprise one or more articles selected but not yet rented and/or purchased. Future rent and/or purchases may be considered important and planned to be taken up in subsequent rent and/or purchases.

An updating step may comprise obtaining apparel data from different sections (e.g., an assistant section, an at-home section, an on-rack section, an on-hold section, etc.) of either a first phase or a second phase based on a plurality of updating events or instructions. The apparel data may be obtained from different sections of the first phase, and the different sections may comprise an at-home section, on-rack section, and on-hold section. The apparel data may be obtained from different sections of the second phase, and the different sections may comprise an assistant section, at-home section, and on-rack section.

For a second phase, a plurality of updating events or instructions may comprise obtaining apparel data from an assistant section if a user prioritizes one or more articles. The plurality of updating events or instructions may further comprise obtaining apparel data from an at-home section from either the first phase or the second phase if a user selects and completes or electronic closet recommendation engines and displays determine one or more selections of try-then-buy, returned favorites, or return notification. The plurality of updating events or instructions may further comprise obtaining apparel data from an assistant section if a user selects and completes or electronic closet recommendation engines and displays determine one or more selections of try-then-buy, returned favorites, below-closet-minimum, next-box-prepared, or next-box-shipped. The plurality of updating events or instructions may further comprise obtaining apparel data from an assistant section if a user moves one or more articles from an on-hold section to an on-the-rack section or moves one or more articles from an on-rack section to an on-hold section, wherein the moving causes the number of articles to change in either the on-hold section or on-rack section. Such change can comprise a situation that the number of articles is changed from a number above a threshold to a number below a threshold. In other embodiments, such change can comprise a situation that the number of articles is changed from a number below a threshold to a number above a threshold.

In yet another embodiment, the plurality of updating events or instructions may comprise obtaining apparel data from an assistant section if a user selects and completes or electronic closet recommendation engines and displays determine one or more selections of try-then-buy or returned favorites. The plurality of updating events or instructions may further comprise obtaining apparel data from an at-home section if a user selects and completes or electronic closet recommendation engines and displays determine the one or more selections of try-then-buy, returned favorites, or return notification. The plurality of updating events or instructions may further comprise updating apparel data in an on-rack section if a user moves one or more articles from an on-hold section to an on-rack section, moves one or more articles from an on-rack section to an on-hold section, or prioritizes one or more articles.

One or more tests associated with the electronic closet recommendation engines and displays of an apparel subscription application may be performed, and a plurality of metrics may be utilized in the one or more tests. The metrics may comprise value metrics, service metrics, engagement metrics, or performance metrics. The value metrics may measure value that users are getting from the apparel subscription application. The service metrics may not be negatively impacted. The engagement metrics may measure user's engagement with the apparel subscription application. The performance metrics may be metrics about performance considerations. Table 1 shows an example of a various scenarios. For example, in the third row of Table 1, a user is trying to purchase (or rent) an article, and a server evaluates that rewards are available for redemption, and an assistant sections shows the user that "you can redeem $10 rewards against your at-home purchases."

TABLE 1

| Theme | Name | Condition | Context |
|---|---|---|---|
| 1 - Purchase | TTB/RF Discounts | User is getting a discount for her current At Home OR RF garment | You are getting extra 30% off your home items |
| 1 - Purchase | RF Additions | Fresh items added in the RF section | You now have more options to purchase from your Returned Favorites |
| 1 - Purchase | Rewards | Rewards available for redemption | You can redeem $10 rewards against your at home purchases |
| 3 - Order Transparency | Box Prepared | Next box being prepared | Your next box with 2 garments is getting processed |
| 3 - Order Transparency | Box Shipped | Next box is shipped | Your next box has been shipped |

TABLE 1-continued

| Theme | Name | Condition | Context |
|---|---|---|---|
| 3 - Order Transparency | BCM | Next box is blocked | You need to closet more before we can send the next box |
| 4 - Education/Onboarding | Prioritization | User next box is getting processed and she does not have anything prioritized | We are working on your next box. Do you want to prioritize some items for it? |

Performance requirements of the electronic closet recommendation engines and displays may comprise requirements for experience responsiveness, load time, or stability. For instance, 75 load time percentile may be below 1 second. Downstream considerations of the electronic closet recommendation engines and displays may comprise downstream aspects to be taken care of after a user has interaction with the electronic assistance service. For instance, once a cancellation of the electronic closet recommendation engines and displays is confirmed, a user may receive a cancellation confirmation email. In another example, a return notification feedback data model may be enhanced to store data from both a test (e.g., a first phase) and a control (e.g., a second phase). Collateral requirements of the electronic closet recommendation engines and displays may comprise requirements other than user experience, including frequently asked questions (FAQ) changes, type of service (ToS) changes, How It Works changes (e.g., changes regarding how the electronic closet recommendation engines and displays work), or any other system requirements. For instance, a loyalty points balance may be available in a marketing automation platform (e.g., MailChimp) so that the loyalty points balance may be mentioned in every email communication to a user. Roll-out requirements of the electronic closet recommendation engines and displays may comprise requirements based on a feature roll-out plan. This example may be rolled-out on both applications, and the test for first phase and the second phase may be required.

Other reporting requirements of the electronic closet recommendation engines and displays may comprise requirements for product, marketing, transaction team, and accounting team. The report requirements may trigger other requirements related to how apparel data is stored and passed across the system. For instance, reports may show month wise opening and closing points liability for accounting, and channel wise points may be earned reports for marketing.

Figure 12:
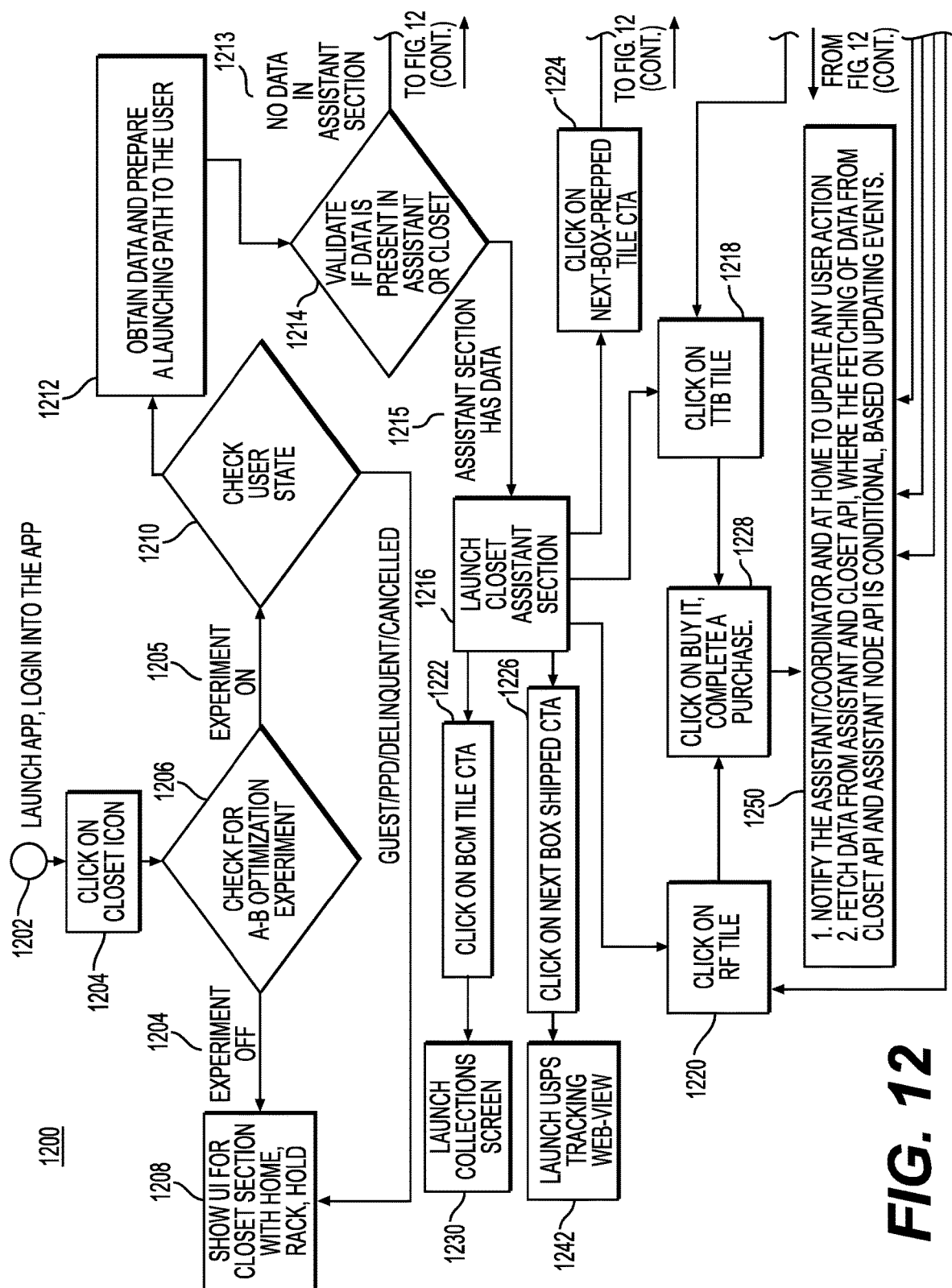
FIG. 12 shows an exemplary flow chart of methods for providing electronic closet recommendation engines and displays for a user of an apparel subscription application.

FIG. 12 shows an exemplary flow chart 1200 of the methods providing electronic closet recommendation engines and displays for a user of an apparel subscription application. As shown in FIG. 12, an apparel subscription application may be first launched and logged in step 1202. Next, a closet icon at the bottom of a user interface 324 may be clicked step 1204 and a status of an experiment environment may be determined 1206. In step 1206, if the experiment environment is off (step 1207), then a first phase of the user interface may be shown 1208 to a user; and if the experiment environment is on (step 1205), then a status of a user may be determined in step 1210. In step 1210, if a user is a non-valid user, a first phase of the user interface may be shown (step 1208) to the user. If a user is a valid user, a second phase of the user interface may be prepared to be shown to the user (step 1212). In step 1212, different data (e.g., closet section data, user recommendation, purchase from history data, etc.) from different APIs (e.g., assistant API) may be obtained and prepared to be shown to a user. Following step 1212, whether apparel data is present may be determined (step 1214).

If the apparel data is present in an assistant section (step 1215), then the assistant section may be launched (step 1216). At the assistant section of the user interface, one or more selections may be made by a user. As shown in the FIG. 12, selections of try-then-buy (step 1218), returned favorites (step 1220), below-closet-minimum (step 1222), next-box-prepared (step 1224), or next-box-shipped (step 1226) can be selected by a user or determined by the electronic closet recommendation engines and displays. If the try-then-buy selection is selected or determined (step 1218), then one or more graphical elements may be shown on a user interface to enable a user to rent and/or purchase the article (step 1228). If the returned favorites selection is selected or determined (step 1220), then one or more graphical elements may be shown on a user interface to enable a user to rent and/or purchase the article (step 1228). If the below-closet-minimum selection is selected or determined (step 1222), then a collection screen may be launched (step 1230). If the next-box-prepared selection is selected or determined (step 1224), then an on-rack section may be launched 1232. In the on-rack section (step 1232), one or more articles can be moved from an on-rack section to an on-hold section, or removed from the on-rack section (step 1234). Another option following launching an on-rack section (step 1232) may be to enable a user to click on an on-hold section (step 1236) to launch the on-hold section (step 1238). In the on-hold section (step 1238), one or more articles can be moved from the on-hold section to an on-rack section (step 1240). If the next-box-shipped is selected or determined (step 1226), then a website may be launched to track shipment (step 1242).

If the apparel data is not present in an assistant section (step 1213), then a present of apparel data in an at-home section may be determined (step 1244). If the apparel data is present (step 1245) in the at-home section, then the at-home section may be launched (step 1246). At the at-home section of the user interface, one or more selections may be made by a user. As shown in the FIG. 12, selections of try-then-buy (step 1218), returned favorites (step 1220), and return notification (step 1248) can be chosen by a user. If the try-then-buy selection is selected or determined (step 1218), then one or more graphical elements may be shown on a user interface to enable a user to rent and/or purchase the article (step 1228). If the returned favorites selection is selected or determined (step 1220), then one or more graphical elements may be shown on a user interface to enable a user to rent and/or purchase the article (step 1228). If the return notification selection is selected or determined (step 1218), then apparel data may be processed and updated (step 1250).

If apparel data is not present (step 1243) in an at-home section, then an on-rack section may be launched (step 1232). In an on-rack section (step 1232), then one or more articles can be moved from an on-rack section to an on-hold section, or removed from the on-rack section (step 1234). Another option following launching an on-rack section (step 1232) is to enable a user to click on an on-hold section (step 1236) to launch the on-hold section (step 1238). In the on-hold section (step 1238), one or more articles can be moved from an on-hold section to an on-rack section (step 1240).

All apparel data obtained in steps 1228, 1234, 1240, and 1248 may be processed and updated (step 1250). The updating step 1250 may comprise updating data after any user's action and/or obtaining data from an assistant API or closet API based on a plurality of updating events. The plurality of updating events or instructions may comprise obtaining apparel data from an assistant section if a user selects and completes or electronic closet recommendation engines and displays determine one or more selections of try-then-buy or returned favorites. The plurality of updating events or instructions may further comprise obtaining apparel data from an at-home section if a user selects and completes or electronic closet recommendation engines and displays determine one or more selections of try-then-buy, returned favorites, or return notification. The plurality of updating events or instructions may further comprise updating apparel data in an on-rack section if a user moves one or more articles from an on-hold section to an on-rack section, moves one or more articles from an on-rack section to an on-hold section, or prioritizes the one or more articles.

One or more application programming interfaces (APIs) may be utilized to carry out the above-mentioned method and/or communicate with different components of the system for providing electronic closet recommendation engines and displays for a user of an apparel subscription application. The one or more APIs may comprise closet content API (for information and content associated with the first phase); closet count API; history count API, which may be removed when data is obtained in closet count API; active count API, which may be removed when data is obtained in closet count API; removed count API, which may be removed when data is obtained in closet count API; fetch DFPtags API; app rating API; get recommendations API; or loyalty notification polling API (rarely).

Additionally, an assistant API may be called. In an example, an operating system may limit to open only 4 HTTP connections at a time for one server, so different APIs may be used in groups. For instance, the closet content API, assistant API, and closet count API, whose data may be used to load a user's electronic closet, may be used in parallel. Once a response of closet count API or closet content API is received, a purchase API (to load a purchase from an at-home section) and get recommendations API may be used. Others APIs may be used in parallel later.

The second phase of the user interface may be responsible for API requests from different sections, including an assistant section, at-home section, and on-hold section. Initially, when an assistant action button 324 presented at the bottom of a user interface is clicked, a second phase of the user interface may be initialized if a user is a valid user. Then an assistant API, closet content API and closet count API may be triggered. Other APIs may be further used. If there is no data from the assistant API then a first phase of the user interface may be automatically shown to a user. If a user selects or electronic closet recommendation engines and displays determine assistant section manually then a relevant message, such as a notification of the user's action, may be displayed to the user on a user interface.

All data associated with the second phase may be obtained through APIs. The triggering of APIs from different sections or events may take place based on data obtained through APIs. For obtaining data, different operations and operation queues may be used. If a user performs any of the activities mentioned in Table 2 below then a corresponding notification may be sent to a notification center to let the second phase know that the apparel data may be refreshed in a particular section. A notification (e.g., a flag) for that particular section may be set. Whenever a user navigates between different sections (e.g., assistant section, at-home section, on-hold section, on-rack section, etc.), the particular section may notify a coordinator (e.g., a second coordinator) that it is about to appear. The coordinator may then update the second phase with information associated with the transition and such updating may trigger or queue an API request on the basis of the state of notification for that section. The notification may be updated after successful data update from different APIs. When an assistant action button 324 presented at the bottom of the user interface is clicked, a response for all sections may be obtained. Thereafter if any specific section is selected or determined, the specific section, not other sections, may be updated. Table 2 shows a plurality of events and relevant actions taken after completing the plurality of events.

The personalization generator 1306 may personalize apparel data displayed to a user 1302 through a client node 1304. The personalization may learn ordering from external input or default ordering. Personalization may be performed based on user's behavior. An assistant API may learn ordering from personalization engine. The plurality of APIs may be block APIs. The block APIs may be able to transmit apparel data if required responses are received. The personalization generator 1306 may have a default order for a new user. The ordering may comprise the order of card layout and the type of card. The type of card may be transient or static. The personalization generator 1306 may learn information

TABLE 2

| Event | Section | Action taken after completion of event |
| --- | --- | --- |
| Return Notify | At Home | notification fired to update flag for assistant and closet content. |
| TTB Buy | At Home | notification fired to update flag for assistant and closet content. |
| PFH | At Home | notification fired to update flag for assistant and closet content. |
| Prioritise | On the Rack | may update the server about the action taken but won't fetch the data from server, instead we may update it locally notification fired to update flag for assistant content. |
| Move to rack | On Hold | may update the server about the action taken but won't fetch the data from server, instead we may update the On hold section locally notification fired to update flag for assistant content. |
| Move to On hold | On the Rack | may update the server about the action taken but won't fetch the data from server, instead we may update On Rack section locally notification fired to update flag for assistant content. |
| Delete | On the Rack | may update the server about the action taken but won't fetch the data from server, instead we may update On Rack locally notification fired to update flag for assistant content. |
| Delete | On Hold | may update the server about the action taken but won't fetch the data from server, instead we may update On hold locally notification fired to update flag for assistant content. |
| PFH | Assistant | notification fired to update flag for assistant and closet content. |
| TTB | Assistant | notification fired to update flag for assistant and closet content. |

Figure 13:
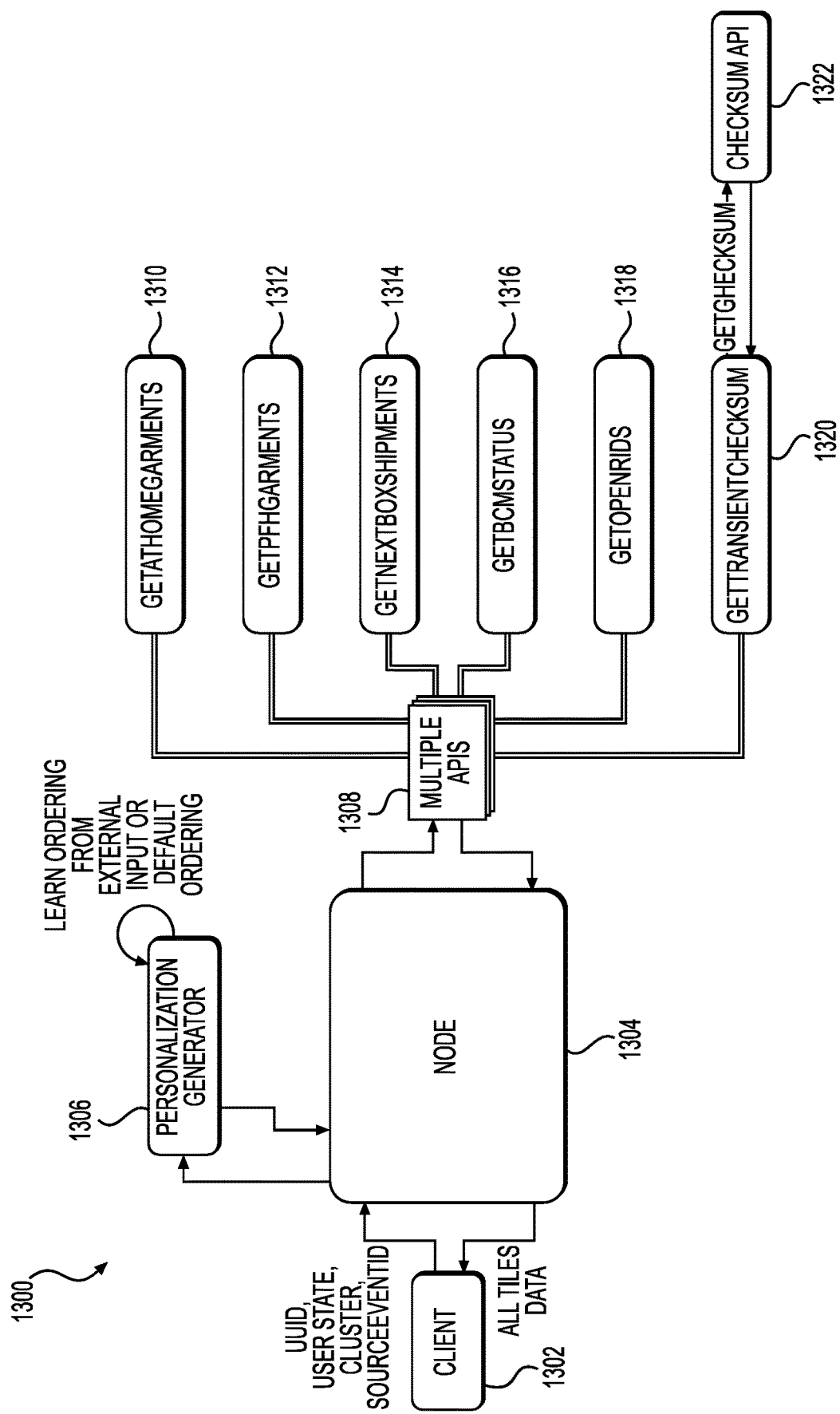
FIG. 13 shows an exemplary architecture of part of a system for providing electronic closet recommendation engines and displays for a user of an apparel subscription application.

The apparel data of the assistant section may be obtained from a client node, whose endpoints, request format and response structure may be shown in FIG. 13. FIG. 13 shows an exemplary architecture of part of a system for providing electronic closet recommendation engines and displays for a user of an apparel subscription application. The architecture 1300 may comprise a client or user 1302, a client node 1304, a personalization generator 1306, and a plurality of APIs 1308. The plurality of APIs 1308 may carry one or more functions. The one or more functions may comprise getting articles presented in an at-home section 1310, getting articles from purchase from history 1312, getting next-box-shipped 1314, getting below-closet-minimum status 1316, getting open RIDs 1318, and getting transient checksum 1320, which is connected to a checksum API 1322. The client node 1304 may obtain data from and transmit data to a plurality APIs 1308. In one example, a client node 1304 may comprise a user device (e.g., an electronic device). The client node 1304 may be associated with, and/or be accessible to, a user/client 1302. The user may input information regarding a user's ID or user's status in the client node 1304. The client node 1304 may also display all apparel data to a user 1302 in a user readable fashion. In another example, a client node may be a computing device (e.g., server) accessible to, and/or associated with, an individual or entity. A client node may comprise a network module (e.g., network adaptor) configured to transmit and/or receive data. Via the nodes in the computer network, multiple users and/or servers may communicate and exchange data.

about a user (e.g., user's behavior) from external sources and provide a suggestion of an order of card layout for the user.

Figure 14:
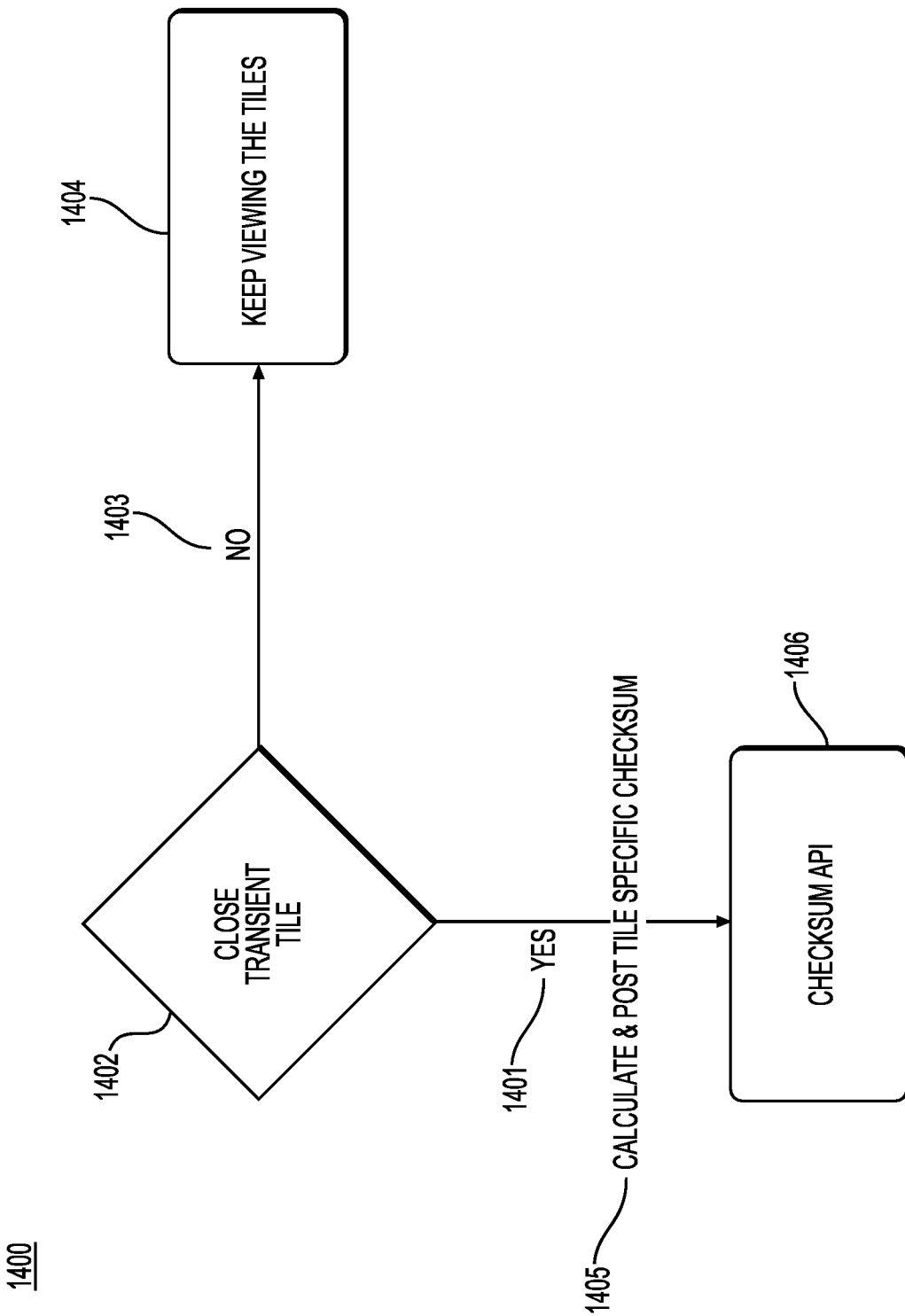
FIG. 14 shows an exemplary flow chart of handling a transient tile or card of an apparel subscription application.

FIG. 14 shows an exemplary flow chart 1400 of handling a transient layout. The transient layout may be any card layout that is not available at all time (e.g., a discount layout expires after a day). The transient layout may be closed by a user 1402. If the transient layout is closed 1401, a checksum may be updated 1405. In step 1405, an assistant API may obtain the checksum and the time checksum is updated, and check with a current card specific checksum. During the process, if the checksum does not match the current card specific checksum, card data may be returned, and if the checksum matches the current card specific checksum, but the time since last update has passed 7 days, the card data may be returned. Other APIs to get and post checksum may be developed in a third phase. If the transient layout is not closed 1403, the layout is kept being viewed 1404.

The benchmarking client node API may be a data visualization dashboard. Dashboard performance of closet content API may comprise 25 load time percentile below 0.1 second (max for 2 weeks), 50 load time percentile below 0.1 second (max for 2 weeks), 75 load time percentile below 0.2 second (max for 2 weeks), 95 load time percentile below 0.4 second (max for 2 weeks), and 99 load time percentile between 1.1 seconds and 2 seconds (max for 2 weeks). Dashboard performance of purchase from history API may comprise 25 load time percentile below 0.5 second (max for 2 weeks), 50 load time percentile below 1 second (max for 2 weeks), 75 load time percentile below 1.2 seconds (max for 1 weeks), 95 load time percentile below 1.7 seconds (max for 1 weeks), and 99 load time percentile below 2 seconds and 2.6 seconds (max for 1 weeks). Dashboard performance of shipment API may comprise 95 load time percentile below 90 milliseconds (max for 1 week) and 99 load time percentile below 250 milliseconds (max for 1 week). Dashboard performance of Rids API may comprise 95 load time percentile below 50 milliseconds (max for 1 week) and 99 load time percentile below 250 milliseconds (max for 1 week). Dashboard performance of below-minimum-closet notification API may comprise 95 load time percentile below 60 milliseconds (max for 1 week) and 99 load time percentile below 90 milliseconds (max for 1 week). Dashboard performance of loyalty points balance API may comprise 95 load time percentile below 100 milliseconds (max for 1 week) and 99 load time percentile below 180 milliseconds (max for 1 week).

FIG. 15 shows an exemplary flow chart 1500 of the methods providing electronic closet recommendation engines and displays for a user of an apparel subscription application. In one aspect, a computer-implemented method for providing electronic closet recommendation engines and displays for a user of an apparel subscription application may comprise a step 1502 of determining a status of the user as being a valid user of electronic closet recommendation engines and displays of an apparel subscription application. The apparel subscription application may be executed by an electronic device of the user. The electronic device may be a mobile device (e.g., smartphone, tablet, pager, personal digital assistant (PDA)), a computer (e.g., laptop computer, desktop computer, server), or any other type of device. The electronic device may optionally be portable. The electronic device may be handheld. The electronic device may be a register at a store or other establishments. The register may be used during transactions (such as financial transactions) at the store or other establishments. The electronic device may be a network device capable of connecting a network, such as a local area network (LAN), wide area network (WAN) such as the Internet, a telecommunications network, a data network, or any other type of network. The electronic closet recommendation engines and displays may comprise one or more executable instructions, software applications, and/or electronic user interfaces that configure an electronic device (e.g., a computer) to automatically analyze data associated with the user's virtual closet, and to generate optimal recommendations and computer-implemented solutions (e.g., one or more computer-implemented servicing functions associated with virtual closet assistance, such as an online transaction of purchasing a piece of clothes for the closet, closet database access, and closet assistance information transfer). A status of a user may comprise a valid user or a non-valid user. A valid user may be a user who pays a fee or is on free-trial to use electronic closet recommendation engines and displays of an apparel subscription application. A non-valid user may be a user who is a guest of, cancels, is a past payment delinquent ("PPD"), or is a delinquent of an apparel subscription application.

The computer-implemented method for providing electronic closet assistance for a user of an apparel subscription application may further comprise a step 1504 of determining, if the user is a valid user, a presence of apparel data in an assistant section of an electronic record corresponding to the user in a database of the electronic closet recommendation engines and displays. Apparel data may comprise any information associated with a user or a user's closet or articles. Such information may comprise a user's selection of articles, a user's color preference, a user's working profession, a user's birth date or age, a user's gender, a user's annual salary, or information about previous clothes purchasing transactions. An article may be any goods, such as clothes, wearable items, accessories, shoes, bags, beddings, or carpets. Clothes may comprise a blazer, coat, blouse, jacket, dress, jeans, jumper, pants, sweaters, swimsuit, T-shirt, shirt, suit, underwear, or gown. A database may comprise one or more memory devices configured to store data (e.g., the apparel data). An assistant section (or a closet assistant section) is described elsewhere herein.

The computer-implemented method for providing electronic closet recommendation engines and displays for a user of an apparel subscription application may further comprise a step 1506 of launching the assistant section of a user interface of the apparel subscription application, if the apparel data is present in the assistant section of the electronic record, wherein the user interface comprises one or more graphical elements displayed on an electronic device of the user. An assistant section may be a part of a database that stores apparel data. In a user interface, an assistant section may also be a screen that displays one or more graphical elements that a user can interact with. An electronic device may comprise a screen that displays a user interface including an assistant section. The electronic device may be capable of accepting inputs via a user interactive component. Examples of such user interactive components may comprise a keyboard, button, mouse, touchscreen, touchpad, joystick, trackball, camera, microphone, motion sensor, heat sensor, inertial sensor, or any other type of user interactive components.

An apparel subscription application may enable individuals to subscribe to an electronic closet recommendation engines and displays of the apparel application through a transaction, such as, for example, a payment. The payment may be a one-time payment or periodic payment. If a payment is a periodic payment, frequency of the periodic payment may be once per at least one week, two weeks, one month, two months, six months, or longer. In other embodiments, frequency of the periodic payment may be once per at most six months, four months, two months, one month, two weeks, one week, or shorter. The apparel subscription application may enable individuals to use an electronic closet recommendation engines and displays for free for a period of time, so the individuals are free-trial users. The period of time for free usage may be at least one week, two weeks, one month, two months, six months, or longer. In other embodiments, the period of time for free usage may be at most six months, four months, two months, one month, two weeks, one week, or shorter. The apparel subscription application may enable valid users to cancel the subscription. The apparel subscription application may enable a valid user to delay one or more payments if the valid user pays periodically, with or without paying a penalty fee. If a valid user delays more than the one or more payments or does not pay the penalty fee when required, the valid user may become a non-valid user (e.g., a PPD). In yet another embodiment, a valid user may become a non-valid user (e.g., a delinquent) if the valid user fails to make one or more payments. The one or more payments may be at least 1, 2, 3, 4, 5, 6, or more payments. In other embodiments, the one or more payments may be at most 6, 5, 4, 3, 2 or fewer payments.

The computer-implemented method for providing electronic closet recommendation engines and displays for a user of an apparel subscription application may further comprise a step 1508 of enabling the user to manipulate the one or more graphical elements to make one or more selections based on the apparel data to receive apparel via the apparel subscription application, wherein the one or more selections comprise try-then-buy, returned favorites, below-closet-minimum, next-box-prepared, or next-box-shipped. The one or more graphical elements may be visual representations with any graphical shape, color, or image contents. A user of the apparel subscription application may be prompted to click or touch the one or more graphical elements to verify a transaction or a login activity. For instance, a user may be provided with a prompt to verify whether the user intends to buy a piece of clothes by clicking or touching one graphical element (e.g., a button shape graphical element). In some cases, the one or more graphical elements may comprise one or more cards, with each card representing a selection that a user can make or electronic closet recommendation engines and displays can determine. The one or more cards and the one or more selections are described elsewhere herein.

One or more of multiple (e.g., 5) types of card layouts may be shown in a section (e.g., an assistant section) of a user interface. For example, each of the card layouts may represent try-then-buy, returned favorites, below-closet-minimum, next-box-prepared, and next-box-shipped, respectively. The card layouts may have different design, size, and shape. For instance, some cards may be wider than other cards. In other cases, the card layouts may have same design, size, or shape. When more than one card layouts are presented in a section of a user interface, the more than one cards may be shown in an order presented in Table 3. Table 3 shows that an example in which the priority rank for presenting different card layouts is set as: first, a below-closet minimum card layout; second, a next-box-shipped card layout; third, a next-box-prepared card layout; fourth, a try-then-buy card layout; and fifth, a returned favorites card layout.

TABLE 3

| Card | Priority |
| --- | --- |
| below-closet-minimum | 1 |
| next-box-shipped | 2 |
| next-box-prepared | 3 |
| try-then-buy | 4 |
| returned favorites | 5 |

The computer-implemented method for providing electronic closet recommendation engines and displays for a user of an apparel subscription application may further comprise a step 1510 of updating the apparel data based on the one or more selections made by the user or determined by electronic closet recommendation engines and displays. The updating step is described elsewhere herein.

The computer-implemented method for providing electronic closet recommendation engines and displays for a user of an apparel subscription application may further comprise a step 1512 of analyzing the updated apparel data to display one or more suggestions to the user in the assistant section of the user interface. Assistant section may be personalized based on analyzing apparel data. The analyzing step may comprise utilizing one or more algorithms. The one or more algorithms may comprise a machine learning algorithm. The machine learning algorithm may utilize one or more neural networks. A neural network can learn the relationships between an input data set (e.g., user's clothes selection, user's purchase history, etc.) and a target data set (e.g., one or more articles that a user may be interested in). The one or more suggestions may comprise any information regarding electronic closet recommendation engines and displays, including, but not limited to, pieces of clothes suitable for a user in one month, accessories that match user's clothes, notifications to a user that he/she needs to buy more articles, a correct size of an article that a user wants to buy, a discount on an article that a user has been interested in for a long time, or any seasonal fashion information.

The computer-implemented method for providing electronic closet recommendation engines and displays for a user of an apparel subscription application may further comprise launching a first phase of the user interface if the user is non-valid user. The first phase of the user interface may not comprise an assistant section. If the user is non-valid user, the user may be a user who is a guest of, cancels, is a past payment delinquent ("PPD"), or is a delinquent of the apparel subscription application. An assistant section may be shown in a second phase of the user interface but not be shown in the first phase of the user interface. The assistant section may be presented in a second phase with an objective to improve order transparency and increase rent and/or purchase opportunities.

The first phase may comprise information associated with an at-home section, on-rack section, and on-hold section. One or more graphical elements (e.g., cards, buttons, etc.) may be used in the first phase to display the at-home section, on-rack section, and on-hold section to a user on a user interface. The at-home section, on-rack section, or on-hold section may be a part of a database that stores apparel data. In a user interface, an at-home section, on-rack section, or on-hold section may also be a screen that displays one or more graphical elements that a user can interact with.

The second phase may comprise information associated with an assistant section, at-home section, and on-rack section. One or more graphical elements (e.g., cards, buttons, etc.) may be used in the second phase to display an assistant section, at-home section, and on-rack section to a user on a user interface. The assistant section, at-home section, and on-rack section may be a part of a database that stores apparel data. In a user interface, an assistant section, at-home section, and on-rack section may also be a screen that displays one or more graphical elements that a user can interact with. An electronic device may comprise a screen that may display one or more user interfaces including an assistant section, at-home section, and on-rack section. The second phase may also comprise information associated with an on-hold section, but the on-hold section may not be shown to a user unless the user is redirected to an on-hold webpage.

The first phase, which does not include an assistant section, may be visible to non-valid users. The second phase, which includes an assistant section, may be visible to valid users. For the second phase, when an assistant section launches, one or more application programming interfaces ("APIs"), including assistant APIs, may be called. In this situation, different APIs associated with an assistant section may be called synchronous and other APIs may be called asynchronously so that the other APIs may not block the user interface to launch the assistant section. In one example, if there is no apparel data presented in an assistant section, an at-home section may be launched; and if there is no apparel data presented in an at-home section, an on-rack section may be launched. In another example, only the section that a user requests may be loaded according to query parameters. A list of query parameters may be shown in Table 4 and Table 5 below.

TABLE 4

| Query parameters | Mandatory? | Description | Possible Values | Comments |
|---|---|---|---|---|
| sourceEventId | YES | to send emitter events, source event id is required | $uuid | e.g. 30d5269d-e31b-426b-ba08-38e1af869d33& |
| Cluster | YES | to identify client type | web.desktop/web.tablet/web.mobile app.android/app.iphone | |
| userState | YES | user state (available as customer subtype in liquid) | $userState | possible values are: free_trial, paid |
| Start | NO | to specify the starting index of tile data to be returned | integer e.g. 0 | FUTURE USE |
| Limit | NO | to limit the no. of tile data to be returned | integer e.g. 5 | FUTURE USE |
| sendWithRecommendation | YES | to get pfh data with recommendations | true | |

TABLE 5

| parameter | Required | Accepted Values | Remarks |
|---|---|---|---|
| namespace | yes | $namespace (0, 301, 302) | This parameter should be used to specify thee nvironment related namespace. (0 for dev data in dev; 301 for qa data in dev; 302 for prod data in dev). If request specifies $namespaceparam, use it else use 0 when calling service APIs. (default ns == 0 for dev data in dev; qa data in qa and prod data in prod) |

The computer-implemented method for providing electronic closet recommendation engines and displays for a user of an apparel subscription application may further comprise launching a catalog section of a user interface of the apparel subscription application. The catalog section may enable a user to select different collections and direct to a product page. The catalog section may be presented in a third phase of a user interface. The third phase of the user interface may also include information or functions associated with completing a look for a user, displaying facets in a user's electronic closet, providing bulk actions related to moving one or more articles across different sections, prioritizing one or more articles, or providing more assistant scenarios.

The computer-implemented method for providing electronic closet recommendation engines and displays for a user of an apparel subscription application may further comprise determining, if the apparel data is not present in the assistant section, a presence of apparel data in an at-home section of an electronic record corresponding to the user in a database of the electronic closet recommendation engines and displays. An at-home section may be a part of a database that stores apparel data. In a user interface, an at-home section may also be a screen that displays one or more graphical elements that a user can interact with. The at-home section may demonstrate a user's previous and potential purchases. The at-home section may comprise any information associated with a user or a user's closet or articles. Such information may comprise a user's selection of articles, images of the articles, prices of the articles, available discounts for the articles, brands of the articles, or popularity of the articles.

The computer-implemented method for providing electronic closet recommendation engines and displays for a user of an apparel subscription application may further comprise launching the at-home section of the user interface of the apparel subscription application, if the apparel data is present in the at-home section of the electronic record. For an at-home section, the computer-implemented method may further enable a user to manipulate the one or more graphical elements to make one or more selections based on the apparel data to receive apparel via the apparel subscription application, wherein the one or more selections comprise try-then-buy, returned favorites, or return notification. In other embodiments, the computer-implemented method may enable electronic closet recommendation engines and displays to determine one or more selections based on the apparel data to receive apparel via the apparel subscription application, wherein the one or more selections comprise try-then-buy, returned favorites, or return notification. The one or more graphical elements may be visual representations with any graphical shape, color, or image contents. A user of the apparel subscription application may be prompted to click or touch the one or more graphical elements to verify a transaction activity. For instance, a user may be provided with a list of articles and asked which articles to buy by clicking or touching one graphical element (e.g., a button shape graphical element). In some cases, the one or more graphical elements may comprise one or more cards, with each card representing a selection that the user can make or electronic closet recommendation engines and displays can determine (e.g., an article that a user can buy).

The try-then-buy selection and returned favorites selection are described elsewhere herein. The return notification may comprise any information associated with a returned article, including, but not limited to, when the article is returned, a rating of the returned article, and when the returned article is rented and/or purchased.

The computer-implemented method for providing electronic closet recommendation engines and displays for a user of an apparel subscription application may further comprise launching an on-rack section of the user interface of the apparel subscription application, if the apparel data is not present in the at-home section of the electronic record. An on-rack section may be a part of a database that stores apparel data. In a user interface, an on-rack section may also display one or more graphical elements that a user can interact with. An electronic device may be configured to display a user interface including an on-rack section. The on-rack section may comprise information associated with articles selected by a user for a current rent and/or purchase or from a previous rent and/or purchase. The on-rack section may further comprise any information associated with a user or a user's closet or articles. Such information may comprise a user's selection of articles, images of the articles, prices of the articles, available discounts for the articles, brands of the articles, or popularity of the articles. The on-rack section may have the same layout as the at-home section.

The computer-implemented method for providing electronic closet recommendation engines and displays for a user of an apparel subscription application may further comprise updating the apparel data based on the one or more selections made by the user. The updating step may be conducted periodically over time or in response to one or more updating events. The updating step may comprise obtaining apparel data from the assistant section based on the one or more updating events. If the updating step is conducted periodically, the time for each updating step may be at least 1 second, 1 minute, 1 hour, 1 day, or longer. In some embodiments, the time for each updating step may be at most 1 day, 1 hour, 1 minute, 1 second, or shorter. The one or more updating events may comprise any activities and occur at any time, including, but not limited to, a user logging into an apparel subscription application, a user performing any selection, a user providing financial verification, a user initiating a transaction, a user requesting completion of a transaction, completion of a transaction, or at any point while a user is accessing the apparel subscription service. The one or more updating events may be initiated by a user, an electronic device of a user, transaction entity, or any other entity. Details of the updating events are described elsewhere herein.

The computer-implemented method for providing electronic closet recommendation engines and displays for a user of an apparel subscription application may further comprise launching an on-hold section of the user interface of the apparel subscription application, if the on-hold section is selected by the user or determined by electronic closet recommendation engines and displays. The computer-implemented method for providing electronic closet recommendation engines and displays for a user of an apparel subscription application may further comprise enabling the user to manipulate the one or more graphical elements to move one or more articles from the on-hold section to the on-rack section, move one or more articles from the on-rack section to the on-hold section, or delete one or more articles from the on-hold section. An on-hold section may be a part of a database that stores apparel data. In a user interface, an on-hold section may also display one or more graphical elements that a user can interact with. An electronic device may be configured to display a user interface including an on-hold section. In a second phase, to go to an on-hold section, a user may scroll down to the bottom of on-rack section and tap a link with text—"Go to on hold."

Analytics may be used to analyze methods and systems for providing electronic closet recommendation engines and displays for a user of an apparel subscription application. One or more events may be tracked by analytics engines. For instance, one event may be triggered when an assistant section is launched and viewed by a user. Another event may be triggered when an at-home section or on-rack section is launched. In another example, an event may be triggered after a user performs certain actions on sections other than an assistant section, which may affect a card layout of the assistant section (e.g., changing the number of articles in an on-rack section, changing priority of articles in an on-rack section, etc.). In yet another example, an event may be triggered when a user visits an assistant section first and then visits other sections.

An event may comprise an event value corresponding to the number of cards loaded and a custom dimension. An event may also be triggered in exceptional cases, such as when a user launches an assistant section but lands on an at-home or on-rack section, because the assistant section has no data. An event may not be triggered after an assistant section is launched, because a user keeps swiping across and viewing the assistant section, at-home section, and on-hold section without performing any purchase or relevant action. An event may be triggered when a user lands on the any section other than an assistant section via deep link or dynamic link even when the assistant section is not viewed by the user.

The electronic closet recommendation engines and displays may comprise different viewing events. One of the view events may be closet landing screen view, which may be captured. Another view event may comprise an assistant section is viewed, and, in this situation, the number of cards present may be captured. Another view event may comprise a particular card is viewed, and, in this situation, a card type may be captured and one or more optimization schemes may be used to reduce the number of events triggered. One or more events associated with a user's action (e.g., a user clicks on a button) may be captured. The electronic closet recommendation engines and displays may comprise screen tracking, including tracking an assistant section as a different screen.

A plurality of analytics questions may be considered. For instance, to evaluate assistant section performance, questions to be considered may comprise what load time of an assistant section is; how many cards are shown in an assistant section when visited by a user; and what percentage of an assistant section visited by a user has zero content. To evaluate assistant section engagement, questions to be considered may comprise how many times an assistant section are viewed per visit; how many actions users are taking per visit; whether the number of actions is correlated with the number of cards; and for each card, what a click through rate is. To evaluate assistant side effects, questions to be considered may comprise what overall closet session duration is; and what overall closet visit frequency is. For a situation that a user is redirected to an at-home or on-rack section, questions to be considered may comprise what load time of an at-home section is; what percentage of redirected users is; whether users go back to check an assistant section immediately; and whether a dynamic navigation results in confusion of a user. To evaluate the performance metrics, try-then-buy metrics, return notification metrics, prioritizing metrics may be considered. Other Metrics may also be considered, including closeting metrics and wearability metrics.

A plurality of custom dimensions may be considered. The custom dimensions may comprise load time of launching a second phase, which may be triggered alone with an event regarding a user's visit of the apparel subscription service. The event regarding a user's visit may be triggered when a user initially launches a second phase for the first time, and load time for launching the second phase may include load time of launching all sections in the second phase. Such load time may not be triggered in subsequent events, such as when an at-home section or on-rack section is re-loaded. The custom dimensions may also comprise load time of launching an assistant section, which is triggered along with an event regarding loading a card. The event regarding loading a card may comprise the situation when a user clicks on a CTA button on a card layout.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

What is claimed is:

1. A computer-implemented method for providing an apparel subscription application, the method comprising:
   determining a presence of apparel data stored in an electronic record corresponding to a user of the apparel subscription application, the electronic record being stored in a database and the apparel data being used for launching an assistant section of the apparel subscription application;
   launching the assistant section in a user interface of the apparel subscription application executing on an electronic device of the user based on the presence of apparel data in the electronic record corresponding to the user;
   rendering, within the user interface, a plurality of graphical elements corresponding to a plurality of available selections, wherein the plurality of available selections comprise at least a returned favorites selection configured to cause a returned favorites layout to be displayed;
   receiving, from the user via the user interface, a selection of at least one of the plurality of graphical elements;
   in response to the user selecting the returned favorites selection, displaying the returned favorites layout via the user interface, the returned favorites layout depicting information regarding one or more articles that the user has favorited, purchased, or rented and given favorable ratings;
   updating the apparel data in the electronic record based on the one or more selections made by the user in relation to the returned favorites layout; and
   analyzing the updated apparel data to display one or more suggestions to the user in the assistant section of the user interface.

2. The computer-implemented method of claim 1, further comprising launching a first phase of the user interface based on a status of the user.

3. The computer-implemented method of claim 2, wherein the first phase of the user interface does not comprise the assistant section.

4. The computer-implemented method of claim 2, wherein the status of the user includes confirming that the user is a valid user who pays a fee or on free trial.

5. The computer-implemented method of claim 2, wherein the status of the user comprises a non-valid user who is a guest of, cancels, is a past payment delinquent of, or is a delinquent of the apparel subscription application.

6. The computer-implemented method of claim 1, further comprising determining, based on the presence of the apparel data in the assistant section, a presence of apparel data in an at-home section of an electronic record corresponding to the user in a database of the apparel subscription application.

7. The computer-implemented method of claim 6, further comprising launching the at-home section of the user interface of the apparel subscription application, based on the presence of the apparel data in the at-home section of the electronic record.

8. The computer-implemented method of claim 6, further comprising launching an on-rack section of the user interface of the apparel subscription application, based on the presence of the apparel data in the at-home section of the electronic record.

9. The computer-implemented method of claim 1, wherein the updating step comprises obtaining the apparel data from the assistant section based on one or more updating events.

10. The computer-implemented method of claim 9, wherein the one or more updating events comprise obtaining the apparel data from the assistant section if the user prioritizes the one or more articles.

11. The computer-implemented method of claim 9, wherein the one or more updating events comprise obtaining the apparel data from the assistant section if the user selects the returned favorites selection.

12. The computer-implemented method of claim 1, wherein the updating step is conducted periodically over time.

13. The computer-implemented method of claim 1, wherein the returned favorites layout further displays to the user information regarding at least a subset of the one or more articles that are on discount.

14. The computer-implemented method of claim 1, wherein the returned favorite layout further displays to the user information regarding least a subset of the one or more articles with options of allowing the user to redeem rewards.

15. A computer system for providing apparel subscription application, comprising:
   a memory storing instructions; and
   one or more processors configured to execute the instructions to perform operations including:
      determining a presence of apparel data stored in an electronic record corresponding to a user of the apparel subscription application, the electronic record being stored in a database and the apparel data being used for launching an assistant section of the apparel subscription application;

launching the assistant section in a user interface of the apparel subscription application executing on an electronic device of the user based on the presence of apparel data in the electronic record corresponding to the user;

rendering, within the user interface, a plurality of graphical elements corresponding to a plurality of available selections, wherein the plurality of available selections comprise at least a returned favorites selection configured to cause a returned favorites layout to be displayed;

receiving, from the user via the user interface, a selection of at least one of the plurality of graphical elements;

in response to the user selecting the returned favorites selection, displaying the returned favorites layout via the user interface, the returned favorites layout depicting information regarding one or more articles that the user has favorited, purchased, or rented and given favorable ratings;

updating the apparel data in the electronic record based on the one or more selections made by the user in relation to the returned favorites layout; and analyzing the updated apparel data to display one or more suggestions to the user in the assistant section of the user interface.

16. The computer system of claim 15, further comprising launching a first phase of the user interface based on a status of the user, wherein the status of the user includes confirmation that the user is a valid user who is a user who pays a fee or on free trial.

17. The computer system of claim 16, wherein the status of the user comprises a non-valid user who is a guest of, cancels, is a past payment delinquent of, or is a delinquent of the apparel subscription application.

18. The computer system of claim 15, wherein the updating step is conducted periodically over time.

19. The computer system of claim 15, wherein the returned favorites layout further displays to the user information regarding at least a subset of the one or more articles that are on discount.

20. The computer system of claim 15, wherein the returned favorite layout further displays to the user information regarding at least a subset of the one or more articles with options of allowing a user to redeem rewards.

* * * * *

UNITED STATES PATENT AND TRADEMARK OFFICE
CERTIFICATE OF CORRECTION

PATENT NO. : 10,817,930 B1
APPLICATION NO. : 16/698195
DATED : October 27, 2020
INVENTOR(S) : Arnab Bhattacharya, Georgiy Goldenberg and Aurelien Labonne Page 1 of 1

It is certified that error appears in the above-identified patent and that said Letters Patent is hereby corrected as shown below:

In the Claims

In Claim 14, Column 30, Line 57, delete "regarding least" and insert --regarding at least--.

Signed and Sealed this
Twelfth Day of January, 2021

Andrei Iancu
*Director of the United States Patent and Trademark Office*